United States Patent
Yih et al.

(10) Patent No.: US 8,135,728 B2
(45) Date of Patent: Mar. 13, 2012

(54) WEB DOCUMENT KEYWORD AND PHRASE EXTRACTION

(75) Inventors: Wen-tau Yih, Redmond, WA (US); Joshua T. Goodman, Redmond, WA (US); Vitor Rocha de Carvalho, Pittsburgh, PA (US)

(73) Assignee: Microsoft Corporation, Redmond, WA (US)

( * ) Notice: Subject to any disclaimer, the term of this patent is extended or adjusted under 35 U.S.C. 154(b) by 291 days.

(21) Appl. No.: 11/619,230

(22) Filed: Jan. 3, 2007

(65) Prior Publication Data

US 2007/0112764 A1    May 17, 2007

Related U.S. Application Data

(63) Continuation-in-part of application No. 11/218,124, filed on Sep. 1, 2005, now abandoned.

(60) Provisional application No. 60/665,061, filed on Mar. 24, 2005.

(51) Int. Cl.
*G06F 7/00* (2006.01)
*G06F 17/30* (2006.01)
*G06F 13/14* (2006.01)

(52) U.S. Cl. ......... 707/765; 707/705; 707/758; 707/759

(58) Field of Classification Search .............. 707/2–7, 707/758, 769, 771, 705–708, 999.003–999.006, 707/999.103–999.104, 765; 715/205, 234
See application file for complete search history.

(56) References Cited

U.S. PATENT DOCUMENTS

| | | | |
|---|---|---|---|
| 6,571,240 B1 * | 5/2003 | Ho et al. ........................ 707/5 |
| 7,089,194 B1 | 8/2006 | Berstis et al. | |
| 7,124,125 B2 | 10/2006 | Cook et al. | |
| 7,346,615 B2 * | 3/2008 | Bem ............................... 707/5 |
| 2002/0072992 A1 | 6/2002 | Elms et al. | |
| 2003/0050929 A1 | 3/2003 | Bookman et al. | |
| 2003/0233224 A1 | 12/2003 | Marchisio et al. | |
| 2004/0186775 A1 | 9/2004 | Margiloff et al. | |
| 2004/0267730 A1 | 12/2004 | Dumais et al. | |
| 2005/0033771 A1 | 2/2005 | Schmitter et al. | |
| 2005/0080775 A1 | 4/2005 | Colledge et al. | |
| 2005/0091111 A1 | 4/2005 | Green et al. | |
| 2005/0149395 A1 | 7/2005 | Henkin et al. | |
| 2005/0209874 A1 | 9/2005 | Rossini | |
| 2005/0222981 A1 * | 10/2005 | Lawrence et al. ................ 707/3 |
| 2005/0262428 A1 | 11/2005 | Little et al. | |
| 2006/0206462 A1 | 9/2006 | Barber | |
| 2006/0218115 A1 | 9/2006 | Goodman et al. | |
| 2006/0229942 A1 | 10/2006 | Miller et al. | |

(Continued)

OTHER PUBLICATIONS

Ribeiro-Neto, et al. "Impedance Coupling in Contenttargeted Advertising" (2005) SIGIR, 8 pages.

(Continued)

*Primary Examiner* — Cam Y Truong
*Assistant Examiner* — Cecile Vo
(74) *Attorney, Agent, or Firm* — Lee & Hayes, PLLC

(57) ABSTRACT

Extraction analysis techniques biased, in part, by query frequency information from a query log file and/or search engine cache are employed along with machine learning processes to determine candidate keywords and/or phrases of web documents. Web oriented features associated with the candidate keywords and/or phrases are also utilized to analyze the web documents. A keyword and/or phrase extraction mechanism can be utilized to score keywords and/or phrases in a web document and estimate a likelihood that the keywords and/or phrases are relevant, for example, in an advertising system and the like.

18 Claims, 17 Drawing Sheets

U.S. PATENT DOCUMENTS

2006/0259473 A1   11/2006   Li et al.
2007/0276829 A1*  11/2007   Wang et al. .................. 707/7
2008/0021878 A1*   1/2008   Jeong ............................ 707/3
2008/0077558 A1*   3/2008   Lawrence et al. ............. 707/3

OTHER PUBLICATIONS

Van Ball, et al. "A Model to Support Targeted Advertising with Term Vectors and Sentiment Distinction" (2005) 3rd Twente Student Conference on IT, 8 pages.

Gutwin, et al. "Domain-Specific Keyphrase Extraction" (1999) IJCAI, 6 pages.

Turney, et al. "Coherent Keyphrase Extraction via Web Mining" (2003) National Research Council Canada, Institute for Information Technology, 7 pages.

Brin, et al. (1998). What can you do with a web in your pocket? Data Engineering Bulletin, 21(2):37-47.

Budzik, et al. (2001). Information access in context. Knowledge based systems, 14(1-2), 37-53.

Czerwinski, et al. (1999). "Visualizing implicit queries for information management and retrieval" in Proceedings of CHI'99, 560-567.

Chen, et al. (1999) "A Gaussian prior for smoothing maximum entropy models." Technical Report CMUCS -99-108, Carnegie Mellon University.

Dumais, et al. (2004) "Implicit Queries (IQ) for Contextualized Search", Annual ACM Conference on Research and Development in Information Retrieval, Sheffield, UK.

Goodman. "Sequential Conditional Generalized Iterative Scaling" (2002), Association for Computational Linguistics, Philadelphia, Pennsylvania.

Google SEC Filing, Aug. 2004.

Henzinger, et al. (2003) "Query-Free News Search". Proc. 12th International World Wide Web Conference.

Madden, et al. (2003), "America's Online Pursuits". Pew Internet and American Life Project.

Rhodes, et al. (2000). "Just-in-time information retrieval agents" IBM Systems Journal, 39(3-4), 685-704.

Dekel, et al. (2003) Log-Linear Models for Label Ranking. NIPS 2003.

Frank, et al. Domain-specific keyphrase extraction. In IJCAI, pp. 668-673, 1999.

Turney. Learning Algorithms for Keyphrase Extraction, Information Retrieval, 1999.

Turney. (2003) Coherent Keyphrase Extraction via Web Mining. In Proceedings Eighteenth International Joint Conference on Artificial Intelligence (IJCAI-03), pp. 434-439, Acapulco, Mexico.

Minkov, et al. EMNLP2005 (2004). Extracting Personal Names from Emails: Applying Named Entity Recognition to Informal Text.

Stephen Prata, C++Primer Plus. Fourth Edition. Copyright 2002. pp. 177-180.

OA mailed Oct. 1, 2007 for U.S. Appl. No. 11/218,124, 20 pages.

OA mailed Feb. 3, 2009 for U.S. Appl. No. 11/218,124, 28 pages.

Final OA mailed Aug. 7, 2008 for U.S. Appl. No. 11/218,124, 35 pages.

OA mailed Apr. 15, 2008 for U.S. Appl. No. 11/218,124, 40 pages.

* cited by examiner

WEB DOCUMENT KEYWORD AND PHRASE EXTRACTION

CROSS REFERENCE TO RELATED APPLICATIONS

This application is a continuation-in-part of U.S. patent application Ser. No. 11/218,124, filed on Sep. 1, 2005 and entitled IMPLICIT QUERIES FOR ELECTRONIC DOCUMENTS which claims the benefit of U.S. Provisional Application Ser. No. 60/665,061, filed on Mar. 24, 2005 and entitled IMPLICIT QUERY SYSTEM AND METHODOLOGY. The entireties of these applications are incorporated herein by reference.

BACKGROUND

Typically, information available on websites and servers is accessed by a web browser executing on a web client (e.g., a computer). For example, a web user can deploy a web browser and access a web site by entering the web site Uniform Resource Locator (URL) (e.g., a web address, an Internet address, an intranet address, . . . ) into an address bar of the web browser and pressing the "enter" or "return" key on a keyboard or clicking a "go" button through utilization of a pointing and clicking mechanism. In some instances, a user knows, a priori, the URL to the site or server that the user desires to access. In such situations, the user can access the site, as described above, by way of entering the URL in the address bar and connecting to the desired site. In other cases, the user will know a particular site that such user wishes to access, but will not know the URL for such site. To locate the site, the user can simply enter the name of the site into a search engine to retrieve such site.

In most instances, however, users desire to obtain information relating to a particular topic and lack knowledge with respect to a name or location of a site that contains desirably-retrieved information. To locate such information, the user can employ a search function (e.g., a search engine) to facilitate locating the information based upon a query. Due to an increasing amount of users becoming sophisticated with respect to the Internet, searching has become an important functionality. In order for a search engine to find related web pages, it utilizes keywords or phrases associated to a web page or web document. When a user enters one of these keywords or phrases the search engine can return appropriate web documents. Thus, correct associations, ranking, and relevancy of the keywords and phrases to web documents is important in returning search results to a user as well as with, for example, contextual advertising systems and the like.

SUMMARY

Keyword and/or phrase extraction mechanisms are utilized to process web documents. Extraction analysis techniques biased, in part, by query frequency information from a query log file and/or search engine cache are employed along with machine learning processes to determine candidate keywords and/or phrases. Web oriented features associated with the candidate keywords and/or phrases are also utilized to analyze the web documents. In one instance, a keyword and/or phrase extraction mechanism can be utilized to score keywords and/or phrases in a web document and estimate a likelihood that the keywords and/or phrases are relevant, for example, in an advertising system and the like. By leveraging web related features, the performance of the keyword and/or phrase extraction of web documents can be substantially increased for query frequency information biased processes.

The above presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later. To the accomplishment of the foregoing and related ends, certain examples are described herein in connection with the following description and the annexed drawings. These examples are indicative of various ways in which aspects described herein may be practiced, all of which are intended to be within the scope of the claimed subject matter. Other advantages and novel features may become apparent from the following detailed description when considered in conjunction with the drawings.

DETAILED DESCRIPTION

Figure 1:
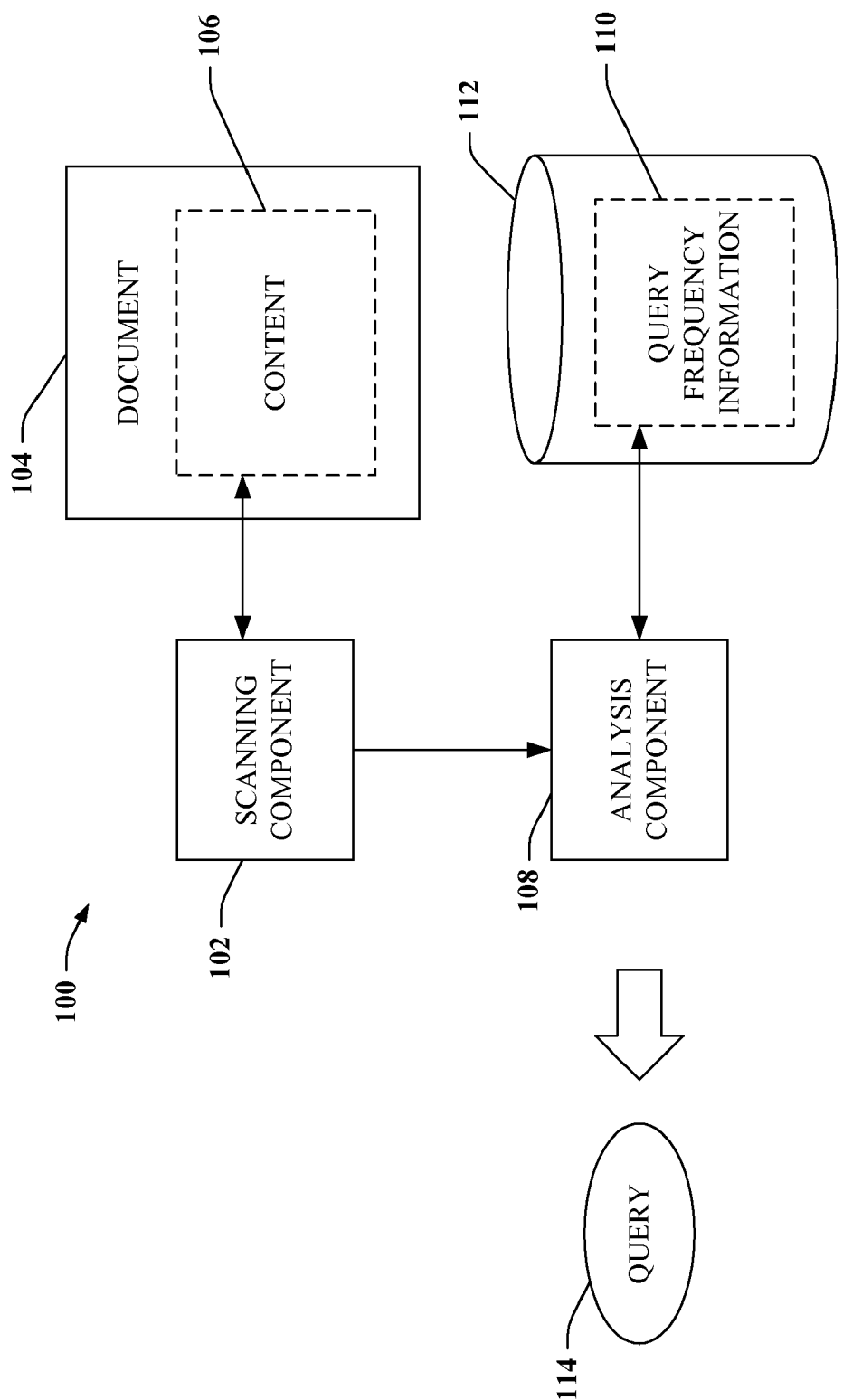
FIG. 1 is a high-level block diagram of a system that facilitates performing implicit querying.

Various aspects of the claimed subject matter are now described with reference to the annexed drawings, wherein like numerals refer to like or corresponding elements throughout. It should be understood, however, that the drawings and detailed description relating thereto are not intended to limit the scope of the claims to the particular form disclosed. Rather, the intention is to cover all modifications, equivalents, and alternatives falling within the spirit and scope of the claimed subject matter.

As used in this application, the terms "component," "system," "engine" and the like are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore the disclosed subject matter may be implemented as a method, apparatus, or article of manufacture using standard programming and/or engineering techniques to produce software, firmware, hardware, or any combination thereof to control a computer to implement aspects detailed herein. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Instances herein provide keyword extraction mechanisms that generate a list of ranked keywords with associated probabilities for web documents. The resulting keywords can be utilized, for example, to drive contextual advertising and the like. This allows an advertising system to provide advertisements appropriate for display with a given web document. The instances typically employ machine learning trained mechanisms that are based on different features extracted for candidate keywords and/or phrases of web documents. Mechanisms employed with web documents leverage query frequency information biased processes for implicit queries for electronic documents. The implicit queries processes are described initially followed by an exemplary web document processing mechanism.

Turning initially to FIG. 1, a system 100 that facilitates performance of implicit querying is illustrated. The system 100 includes a scanning component 102 that is employed to analyze a document 104. For instance, the document can be a web document and/or an email message and the like, and the scanning component 102 can perform analysis of the document 104 on a computer that is delivering the document 104, on a server that facilitates delivery of the document 104, on a computer that is a final recipient of the document 104, or any intermediary computing device. It is understood, however, that the document 106 can be any suitable electronic document, including a word processing document, a spreadsheet document, a slide declaration, an instant messenger conversation, a text message, a chat message, an extensible markup language (XML) document, a hypertext markup language (HTML) document and the like.

The scanning component 102 is employed to scan/extract content 106 of the document 104, wherein the content 106 can be text, one or more images, one or more objects, metadata associated with the document 104 (such as time of creation, location of creation of the document 104, author of the document 104, type of image within the document 104, web document information, header information . . . ), etc. More granular and/or restricted scanning/extraction can be undertaken by the scanning component 102 depending upon a type of the document 104. For instance, the document 104 can be a web document and/or an email message, and the scanning component 102 can be employed to extract text existent in any part of the web document (meta data, body, etc.) and/or in the subject line of an email message. Similarly, the scanning component 102 can extract text in the body of the email message, anywhere within the email message, at a beginning of the email message (e.g., scan words within a first number of characters within a body of the email message 104), and the like. In yet another example, the document 104 can be a word processing document, and the scanning component 102 can scan particular portions of the word processing document, such as highlighted portions, beginnings or ends of sections, beginning or ends of pages, beginnings or ends of paragraphs, text within the document associated with particular fonts, font sizes, and/or styles (e.g., bold, underline, italicized). Still further, the scanning component can detect whether a name in a document is a first name only, a last name only, appearing in a "From," "To," or "CC" portion of an email message, a domain name, and/or partially or fully numerical results. Thus the scanning component 102 can scan/extract any suitable portion or combination of portions of the document 104, and such portions or combinations thereof can be defined depending on type of the document 104.

An analysis component 108 can analyze the content 106 scanned by the scanning component as well as receive query frequency information 110 from a data repository 112. Based at least in part upon the scanned content and the query frequency information 110, the analysis component 108 can output at least one query 114 to a user. For example, the analysis component 108 can generate the query 114 based at least in part upon the scanned content 106 of the document 104. Prior to outputting the query 114, however, the analysis component 108 can determine whether the query 114 is associated with a sufficiently high frequency by way of the received query frequency information 110. Thus, the analysis component 108 can dictate that the output query 114 be amongst a top N most frequently utilized queries, where N is an integer from one to infinity. In another example, the analysis component 108 can be restricted to generating queries within a top N most frequently utilized queries—the consideration of a finite number of queries renders the system 100 more efficient when compared to a possibility of the analysis component 108 generating queries de novo. In another example, the analysis component 108 can output the query 114 to a user if frequency of utilization associated with the query 114 is above a defined threshold. The query frequency information 110 can be gleaned from analyzing log files associated with a search engine, analyzing a cache of a search engine, or any other suitable means for determining query frequency. Furthermore, the analysis component 108 can compare scanned content with language within queries that are associated with sufficient frequency in connection with outputting the query 114. Thus, the analysis component 108 can extract keywords or phrases from a document by accessing query frequency information from a query log file and/or presence of a query in a search cache. Furthermore, a list of returned keywords can be restricted to those in the query log file or the search cache, and frequency of such keywords in the query log file/search engine cache can be employed in connection with determining keywords/phrases to extract.

While the analysis component 108 has been described with respect to utilizing the query frequency information 110, various other factors can be accounted for by the analysis component 108 in connection with outputting the query 114. For instance, disparate portions of the document 104 can be weighted differently, and the analysis component 108 can take such weighting into account when outputting the query 114. More specifically, the text within a subject line of an email message can be weighted more heavily than text within a body of the email message. Likewise, different weighting can be given, for example, to metadata in a web document than in the body and vice versa. Furthermore, frequency of words or phrases within a header of a web document and/or a subject line of an email can be considered at a disparate weight than frequency of words or phrases within the body of a web document and/or an email message. In another example, frequency of words or phrases at or near a beginning of a body of a web document and/or an email message can be considered as a factor when outputting the query 114. Still further, length of a phrase (measured in words, characters, or tokens), whether or not text is capitalized (such as whether a first word in a phrase is capitalized, whether a last word of phrase is capitalized, a number of capitalized words in a phrase, whether surrounding words are capitalized, . . . ), location of a word or phrase within a sentence, length of a message, whether a message is a reply or forward, and the like can be considered and weighted disparately.

Still more parameters that can be considered by the analysis component 108 include a click-through rate associated with keywords or phrases, whether particular punctuation marks are included within a phrase and/or surrounding a phrase, whether phrases are solely numeric (which tend to relate to poor queries), whether a long phrase and a short phrase included within the long phrase are located (if desired, only the long phrase can be returned as a possible query). Still further, the analysis component 108 can consider whether a phrase consists solely of a first name, solely of a last name, or is a combination of a first and last name. First and last names often appear to be useful queries, as they occur often in a document and are capitalized. Furthermore, in practice, they appear often in query files (even though they are often not useful queries). Reasons for return of names as queries include "threading," which is the inclusion of a previous message in a new message. This can cause "To," "From," and "CC" lines from previous messages to be included, and if there are multiple instances of "threading," then names, email addresses, domain names that are part of email addresses, and the like can occur repeatedly (getting a high count) even though such words/phrases tend to be poor queries. Accordingly, the analysis component 108 can locate "From," "To," and "CC" lines and discount or ban queries for words in such lines. Similarly, words or phrases that are part of email addresses can be discounted, phrases associated with text such as "On 'DATE' 'PERSON (EMAIL ADDRESS)' wrote:" can be discovered and text associated therewith can be discounted by the analysis component 108. Moreover, "tag line" advertisements, which can be located at the end of many messages (depending on email service provider) can be discovered and not considered by the analysis component 108. As can be discerned from the above, any suitable parameter (or a combination of parameters) relating to the document 104 can be considered by the analysis component 108 when outputting the query 114.

The analysis component 108 can also analyze the content 106 and compare such content 106 with text of high-frequency queries, wherein queries most similar to the scanned content 106 can be provided to a user. Furthermore, a probability of relevance can be computed with respect to the query 114. If the probability is below a threshold, then the query 114 can be discarded. Similarly, queries can be output and displayed as a function of the calculated probabilities as well as results associated therewith. More specifically, for example, if two queries are returned with substantially similar probabilities of relevance, an equal number of search results associated with the queries can be provided to the user, while if the most probable query has a probability much higher than the second-most probable one, then only search results for the most probable query may be returned.

The analysis component 108 can be built by way of training data and selecting weighting parameters associated with content of documents (described above). Thereafter, a measure of correctness can be assigned to returned queries to track and/or improve the system 100. For instance, test subjects can manually select text within web documents and/or email messages for which they would like to obtain a greater amount of information. A model can be designed and run against the web documents and/or emails, and results of the model and the manual selection by users can be compared. The system 100 can then be updated as a function of the comparison, wherein disparate web documents and/or email parameters can be provided with different weights until the system 100 is optimized for a particular utilization or set of users.

In accordance with one aspect, the analysis component 108 can include one or more logical regression models that can include TF/IDF and other traditional choices as special cases, but can also return probabilities (to facilitate selection of the query 114). Logistic regression models are also called maximum entropy models in some communities, and are equivalent to a certain kind of single layer neural network. In particular, logistic regression models are of the form:

$$P(y \mid \overline{x}) = \frac{\exp(\overline{w} \cdot \overline{x})}{1 + \exp(\overline{w} \cdot \overline{x})} \quad \text{(Eq. 1)}$$

In the above equation, y is the entity being predicted (in this case, y takes the values 0 or 1, with 1 meaning that a particular word or feature is a good query for a particular message.), and $\overline{x}$ is a vector of numbers representing the features of a particular word or message in an email message. For instance, features might include a number of times that a word or phrase occurs in a subject line; a number of times the word or phrase occurs anywhere in the body; and 0 or 1 representing whether the word or phrase is capitalized. Finally, $\overline{w}$ can represent a set of weights. These weights can be indicative of relative weights for each feature for each word or phrase. In more detail, if subject words are twice as important as body words, $w_1$ might have twice the value of $w_2$. The weights can be learned by way of training data (e.g., a corpus of messages for which relevant words or phrases have been hand-labeled). Essentially, for every word or phrase in each message, a training example can be employed, with value y=1 if the word was labeled as relevant, and a value 0 otherwise. The vast majority of words are labeled as irrelevant. A learning algorithm can then be employed that maximizes the probability of the training data, assigning as large a probability as possible to those words or phrases that were relevant, and as small as possible to those that were not. In one particular example, a training algorithm that can be employed is a Sequential Conditional Generalized Iterative Scaling algorithm. Furthermore, Logistic regression models can be trained to optimize entropy of training data, which is also equivalent to making the training data as likely as possible. In other words, logistic regression models are useful in connection with estimating probabilities.

Figure 2:
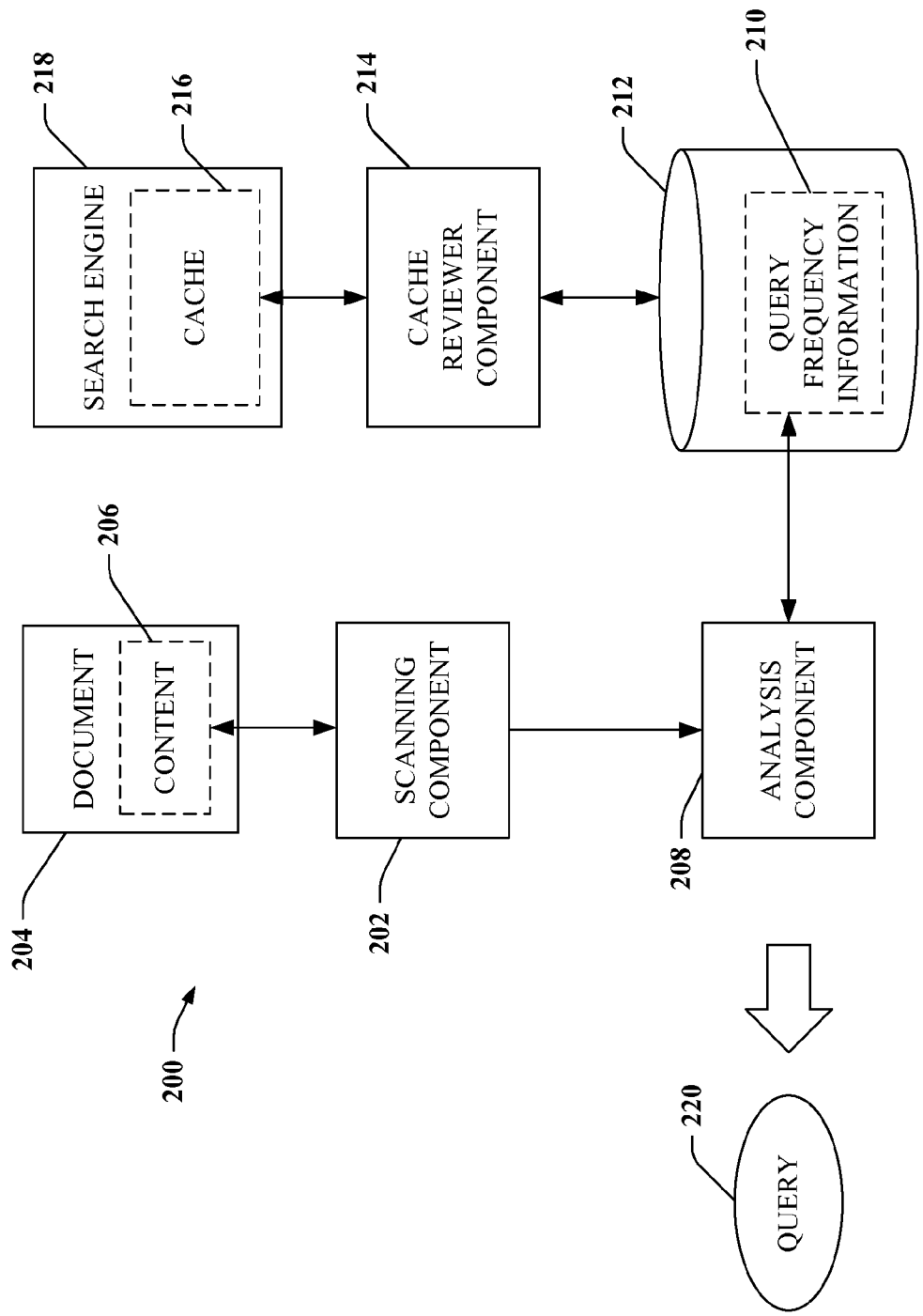
FIG. 2 is a block diagram of a system that utilizes a search engine cache in connection with performing implicit query generation.

Now turning to FIG. 2, a system 200 that facilitates implicit querying is illustrated. The system 200 includes a scanning component 202 that receives an electronic document 204, such as a web document, an email message, an instant messenger conversation, a word processing document, a spreadsheet, a slide presentation, a text message, or other suitable electronic document(s). The document 204 includes content 206, which can be text, images, objects, metadata, a combination thereof, and/or other suitable content. The scanning component 202 can extract particular portions of the content 206 and deliver such portions to an analysis component 208. For example, the scanning component 202 can extract particular portions of the content 206 according to pre-specified rules, such as "extract first five words of every sentence," "extract words in a subject line," "extract capitalized words," "extract words associated with a particular font," etc. These rules can be determined through empirical data and/or designed for a particular application and/or user.

The analysis component 208 receives the scanned content as well as known query frequency information 210 that can reside within a data repository 212. The data repository 212 can exist locally on a consumer-level computer device, on an email server, within a search engine server, etc. If the query frequency information 210 is substantial, a hash of such information can be generated to reduce amount of storage space needed to house such information 210. The query frequency information 210 can be created by a cache reviewer component 214 that monitors a cache 216 associated with a search engine 218. In more detail, many search engines maintain a cache of most frequently utilized queries and results associated therewith. Some search engines may maintain a cache of most recently utilized queries, but in general, any frequently utilized query will be among the more recent queries as well. Thus, if a cached query is provided to the search engine 218, the search engine 218 can quickly retrieve results of the query from the cache 216. The cache 216 can therefore be utilized to obtain information relating to query frequency, as the cache 216 includes an integer number of most utilized queries. Moreover, the cache reviewer component 214 can at least periodically monitor the cache 216 for alterations to queries stored therein. For example, certain queries may be seasonal, and thus fall in and out of the cache 216 depending upon time of year. The cache reviewer component 214 can thus monitor the cache 216 to ensure that the query frequency information 210 remains current.

The cache reviewer component 214 can analyze content of the cache 216 in connection with generating the query frequency information 210. For instance, the query frequency information 210 can consist of queries within the cache 216, frequency information associated with queries within the cache 216, and any other suitable query frequency information. The analysis component 208 can receive the query frequency information 210 as well as content scanned by the scanning component 202 and output a query 220 based at least in part thereon. For example, the query frequency information 210 can consist of a number N of most utilized queries, and the analysis component 208 can be restricted to outputting the query 220 so that it corresponds with one of the N most utilized queries. This can reduce processing time, as the analysis component 208 can be aware of the restrictions prior to receipt of content scanned by the scanning component 202. In another example, the analysis component can generate a query solely based upon the content 206 of the document 204 scanned by the scanning component 202, and thereafter examine query frequency information associated with such query. If the query frequency is above a specified threshold, the generated query can be output to a user as the query 220. Other manners of utilizing the query frequency information 210 in connection with content of the document 204 scanned by the scanning component 202 are also contemplated by the inventor, and such manners are intended to fall within the scope of the hereto-appended claims.

While not shown, the output query 220 can be amongst a plurality of queries output by the analysis component 208, and can be selectable by a user. Upon selection of the query 220, the query 220 can be delivered to the search engine 218 which can thereafter return results of the query 220 to the user. For example, the query 220 can be presented to a user as a hyperlink, and upon selection of the hyperlink by way of a pointing and clicking mechanism, keystrokes, or the like, the query 220 can be relayed to the search engine 218. Other manners of selecting the query 220, including voice commands, pressure-sensitive screens, and the like can also be employed by a user in connection with selecting the query 220. In another example, the query 220 (and search results associated therewith) can be automatically delivered to the search engine 218 without requiring user interaction.

Furthermore, the query 220 and/or results associated therewith can be displayed in a frame associated with the document 204, thereby enabling a user to concurrently view the query 220 and/or results associated therewith concurrently with the document 204. In another example, the query 220 can be displayed concurrently with the document 204, but search results associated therewith can be presented in a separate browser window. In still another example, the query 220 and/or associated results can be presented in a viewing application separately from that utilized to display the document 204 so as not to impede the user's view of the document 204. Each of the exemplary viewing modes as well as other related viewing modes can be customized by a user. For instance, a first user may wish to retain a full-screen view of the document 204, and thus have the query 220 and/or results associated therewith displayed on a separate display window, while a second user may wish to have the query 220 and/or associated results displayed concurrently with the document 204 in, for example, a dedicated frame.

Figure 3:
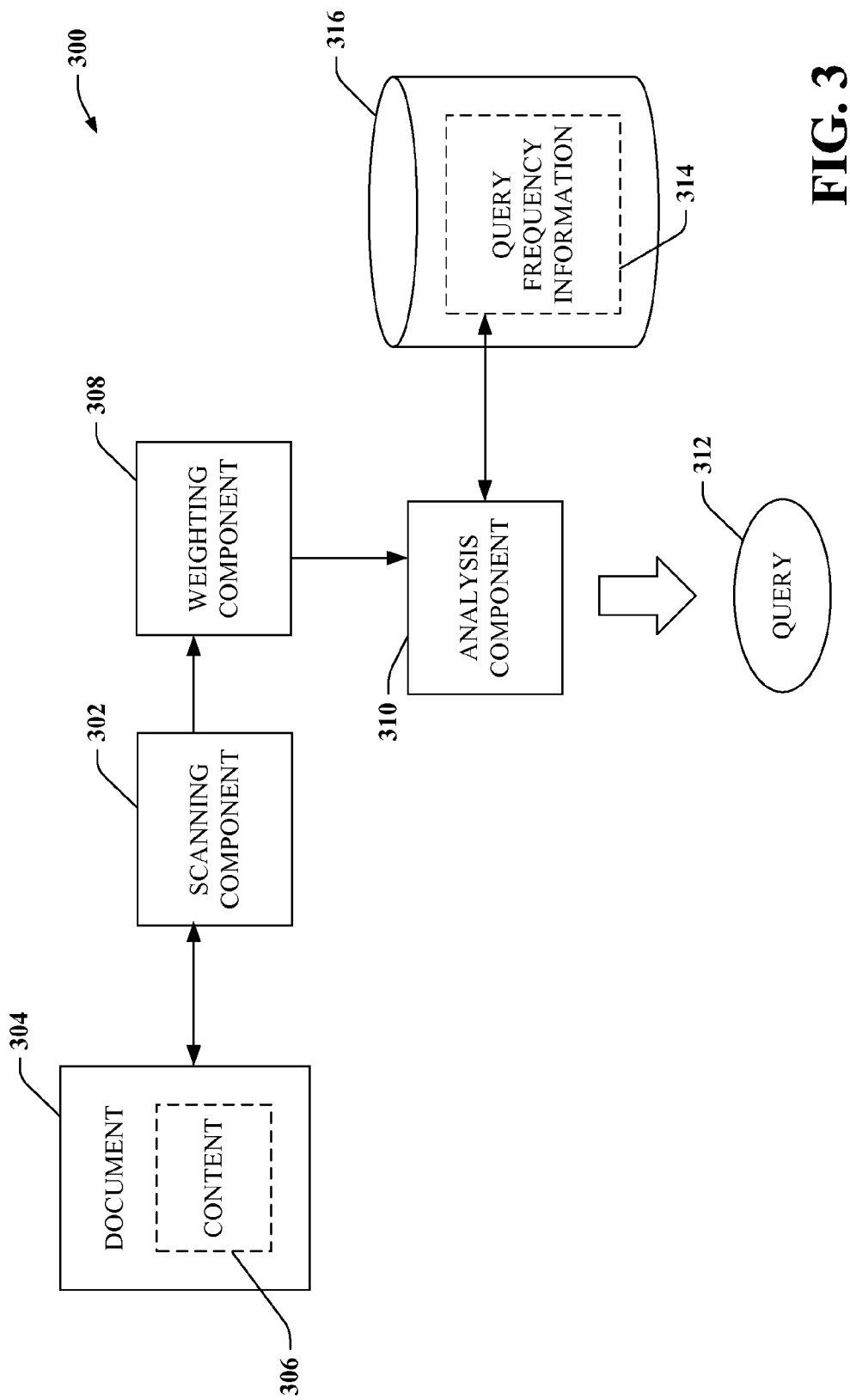
FIG. 3 is a block diagram of a system that facilitates weighting of particular portions of content of an electronic document in connection with outputting a query to a user.

Referring now to FIG. 3, an implicit query system 300 is illustrated. The system 300 includes a scanning component 302 that is utilized to extract information from an electronic document 304. For instance, the document 304 can include content 306, such as text, metadata, images, objects, and the like, and the scanning component 302 can be employed to extract and/or identify particular portions of the content 306. For instance, the scanning component 302 can identify text within metadata of a web document and/or within a subject line of an email message and thereafter extract at least a portion of such text. The scanning component 302 can be communicatively coupled to a weighting component 308 that can assign weights to disparate portions of the document 304. For instance, empirically it can be determined that certain portions of documents are of greater interest to a user than other portions of documents. In more detail, a first number of words of a sentence can be determined as more of interest to a user than subsequent words. Similarly, if the document 304 has a subject, it can be determined that text within the subject is of more value than text within a body. In yet another example, phrases of a particular length can be deemed more valuable when generating queries than phrases of a disparate length—thus, the weighting component 308 can provide disparate weights to the phrases. The weighting component 308 can therefore assign weights to disparate portions of the content 306 scanned by the scanning component 302 depending upon value of such content with respect to query generation.

The content 306 of the document 304 that is scanned by the scanning component 302 and weighted by the weighting component 308 is relayed to an analysis component 310, which can analyze the weighted content and generate a query 312 based at least in part upon such weighted content. For instance, particular words or phrases extracted from the document 304 by the scanning component 302 and weighted by the weighting component 308 may be of interest to a user. The analysis component 310 can analyze such words or phrases and generate the query 312, wherein the query 312 is created to enable obtainment of additional information from a search engine relating to the words or phrases.

The analysis component 310 can also receive query frequency information 314 (existent within a data store 316) and utilize such information 314 in connection with generating/outputting the query 312. For example, the analysis component 310 can be restricted to outputting a query that corresponds to a query with a set of queries associated with sufficiently high frequency (e.g., a set of queries that are amongst an integer number of most utilized queries in connection with a search engine). Such information can be included within the query frequency information 314.

Figure 4:
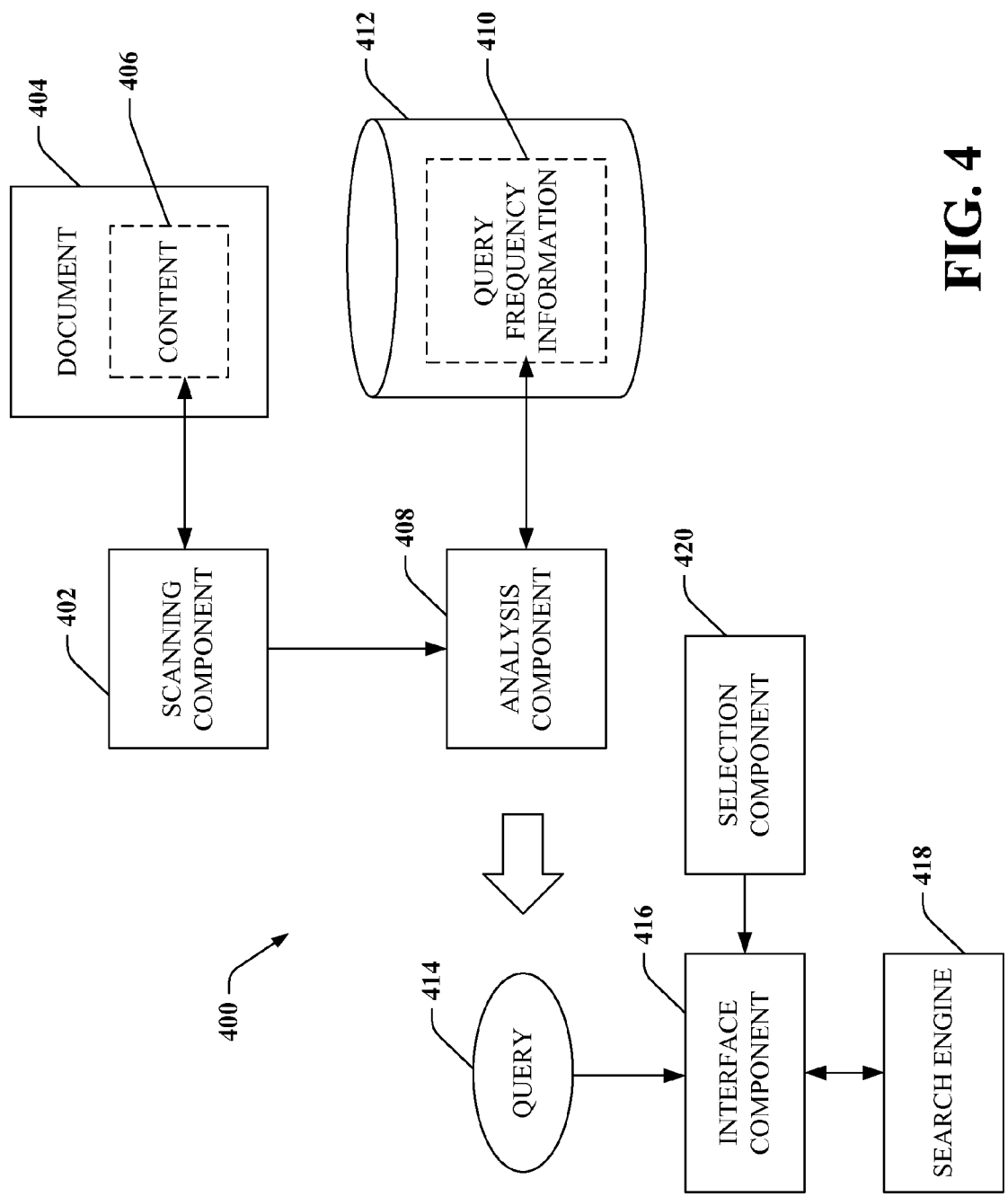
FIG. 4 is a block diagram of a system that facilitates searching for content upon receiving a user-selection of a query.

Referring now to FIG. 4, a query generation system 400 is illustrated. The system 400 includes a scanning component 402 that is employed to extract information from an electronic document 404. For example, the document 404 can include content 406 such as text, images, metadata, objects, and the like, and the scanning component 402 can extract at least some of such content 406 to enable automatic generation of a query. An analysis component 408 can receive such extracted content and automatically generate a query based at least in part thereon. The analysis component 408 can also receive query frequency information 410 that exists within a data repository 412, which can reside locally upon a consumer-level computer, within an email system (e.g., on an email server), on a search engine server, or any other suitable location.

Upon receipt of information from the scanning component 402 and receipt of the query frequency information 410, the analysis component 408 can output a query 414 that relates to the content 406 of the document 404. In more detail, the query 414 can be utilized to obtain more information with respect to the content 406 of the document 404. For example, the document 404 can be an email message and have the following text within the subject line: "The weather is terrible." The email message can originate from New York, and metadata indicating as much can be associated with the message. Likewise, a title from a web document can read "Pets Kill Owner" and the body of the web document can be analyzed to determine that the pets are alligators. The scanning component 402 can extract such information and deliver it to the analysis component 408, which can in turn generate a query, such as "weather in New York" and/or "alligators as pets" and the like. The analysis component 408 can receive query frequency information 410 relating to the query 414 and determine that the query 414 is associated with a sufficiently high frequency (e.g., is within the ten million most frequently utilized queries). The query 414 can thereafter be output to a user. In another example, the analysis component 408 can receive the same information as above, except such component 408 receives the query frequency information 410 prior to generating the query 414. For instance, the analysis component 408 can determine that the term "weather" should be included within the query 414, and thereafter access the query frequency information 410 to analyze high-frequency queries that include the term "weather." Such queries can be cross-referenced with high-frequency queries that include the term "New York." The analysis component 408 can then undertake an iterative process until a high-frequency query that is sufficiently relevant to the content 406 of the document 404 is located.

Upon the analysis component 408 outputting the query 414, such query 414 can be provided to an interface component 416 that can interface the query 414 to a search engine 418. For instance, the interface component 416 can be a graphical user interface that displays the query 414 in hyperlink form to a user. Further, the interface component 416 can be hardware and/or software that facilitates physical deliverance of the query 414 to the search engine 418. For instance, the interface component 416 can include network cables, transmitters, and the like that enable transmission of the query 414 from an email server and/or networked computer to the search engine 418. A selection component 420 is associated with the interface component 416 and enables user-selection of the query 414, upon which the query 414 is delivered to the search engine 418. The selection component 420 can be a pointing and clicking mechanism, a keyboard, a microphone, a pressure-sensitive screen, etc. Thus, the query 414 can be prohibited from being delivered to the search engine 418 until user selection thereof. It may be desirable, however, to automatically deliver the query 414 to the search engine 418. In this instance, the selection component 420 can be bypassed, and the query 414 can be delivered to the search engine 418 without user intervention.

Figure 5:
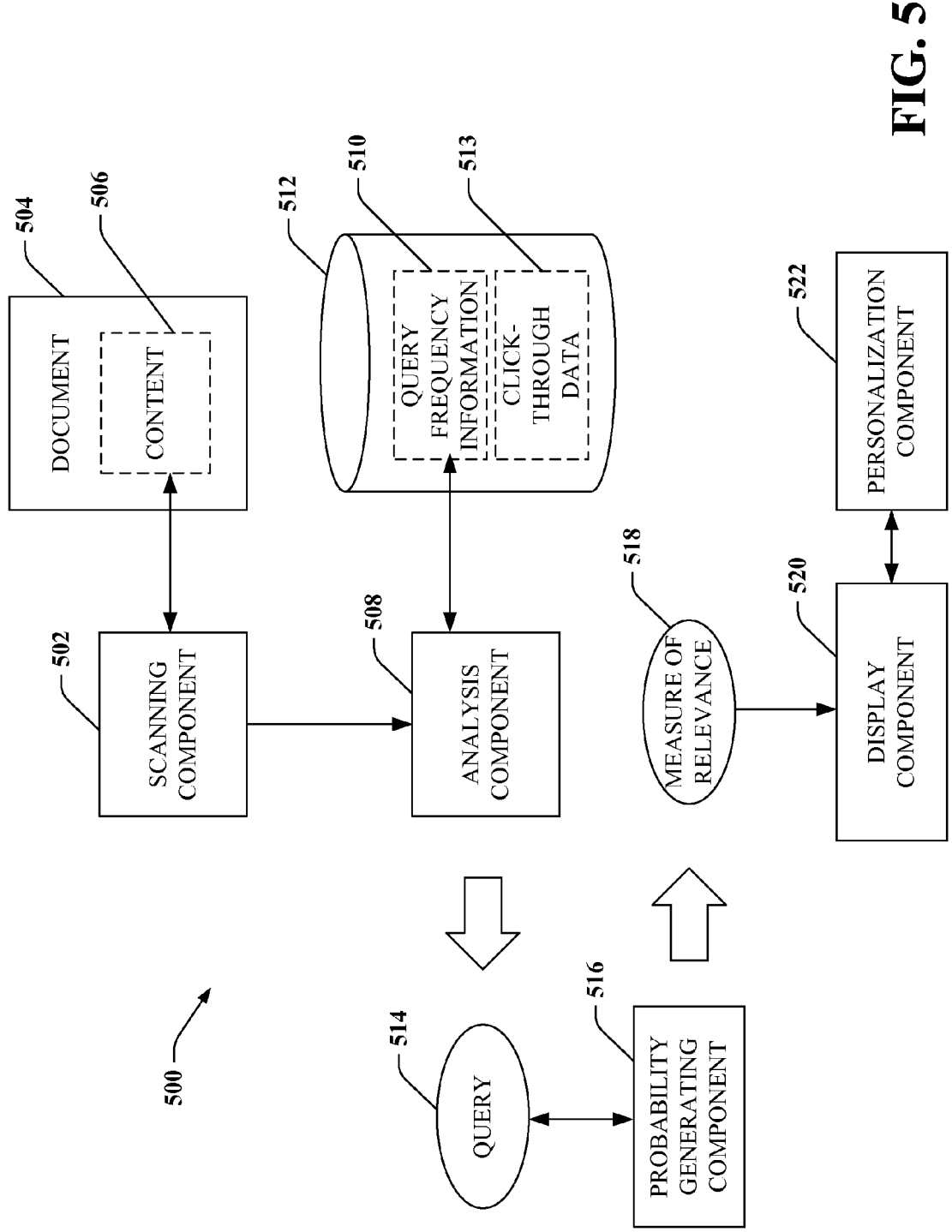
FIG. 5 is a block diagram of a system that facilitates associating probabilities of relevance with implicitly generated queries.

Turning now to FIG. 5, an implicit querying system 500 is illustrated. The system 500 includes a scanning component 502 that receives an electronic document 504, wherein the electronic document 504 includes particular content 506 (e.g., sections, text, . . . ). The scanning component 502 identifies portions of the content 506 and/or extracts portions of the content 506 and relays identified and/or resultant portions to an analysis component 508. The analysis component 508 receives the identified and/or resultant portions as well as query frequency information 510 (from a data repository 512). The analysis component 508 can utilize the received portions and the query frequency information 510 in conjunction to output and/or generate a query 514 (as described with respect to FIGS. 1-4 above). Furthermore, the analysis component 508 can receive click-through data 513 and utilize such data in connection with extracting one or more of a keyword and a phrase from the electronic document 504. For example, the analysis component 508 can be utilized in connection with selling space to an advertiser, thus the click-through data 513 can be useful in connection with determining what types of advertisements to sell (based on the extracted keywords and/or phrases).

The resultant query 514 can then be relayed to a probability generating component 516 that can generate an estimated measure of relevance 518 for the query 514. For instance, the probability generating component 516 can monitor user action over time to determine a likelihood that the query 514 is relevant to a user. Further, the probability generating component 516 can solicit and/or receive explicit information from a user regarding whether various queries are relevant, and such information can be utilized by the probability generating component 516 to determine the measure of relevance 518 associated with the query 514. For instance, the probability generating component 516 can issue questions and/or selectable statements to a user relating to a query (e.g., a sliding bar indicating level of relevance of a received query with respect to a document). For example, over time the probability generating component 516 can determine that the word "love" (as in "I love you") in documents associated with a particular user does not indicate that the user is single. Thus, queries utilized to locate online dating services would be associated with a low measure of relevance, while queries utilized to locate flowers may be of high relevance. The probability generating component 516 can also utilize frequency information associated with the query 514 to estimate the measure of relevance 518. For instance, the measure of relevance 518 can be affected by frequency of utilization of the query 514 (e.g., a low frequency of use can adversely affect the measure of relevance 518 or of the results of issuing the query to a search engine).

A display component 520 can receive the query 514 and the measure of relevance 518 associated therewith and generate a display based at least in part upon the measure of relevance. For instance, the query 514 can be amongst a plurality of queries that are to be displayed to a user, and the measure of relevance 518 can be utilized to determine where to position the query 514 within the plurality of queries. In more detail, if the query 514 is associated with a highest measure of relevance 518 when compared to other queries, such query 514 can be displayed more prominently when compared to the disparate queries (e.g. atop a list of queries). Similarly, the display component 520 can associate the query 514 with a particular color indicative of estimated relevance of such query 514. The display component 520 can also be employed to format a display that is provided to a window, such as size and location of a frame utilized to display the document 504, size and location of a frame utilized to display the query 514, and the like. Furthermore, a personalization component 522 can be utilized to customize presentation of the document 504 and the query 514 (or queries) to a user. For instance, a user can specify any suitable display parameter desirable by way of the personalization component 522, and subsequent documents and queries can be displayed accordingly. For instance, the user may only wish to be provided with a threshold number of queries, and can inform the display component 520 of such wishes by way of the personalization component 522. Subsequently, the user will be provided with the specified number of queries. A keyword will typically cause something to be displayed: the word itself, search results generated from the word; or an advertisement generated from the word. The system can monitor the click through rate of items associated with the keyword and use this as an input to future keyword extraction.

Figure 6:
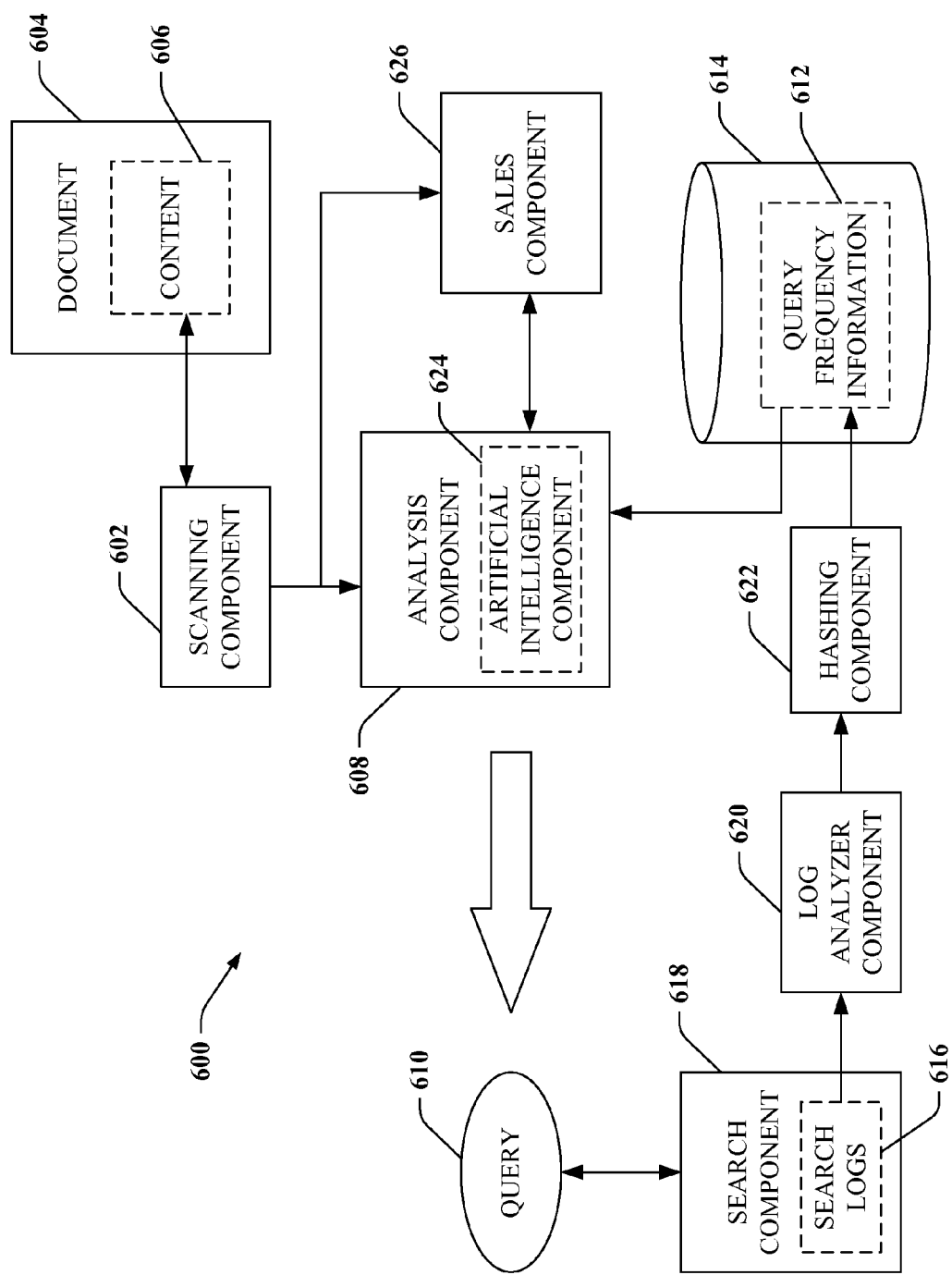
FIG. 6 is a block diagram of a system that facilitates reducing space required to store query frequency information.

Referring now to FIG. 6, an implicit query system 600 is illustrated. The system 600 includes a scanning component 602 that receives an electronic document 604 and content 606 associated therewith. The scanning component 602 can identify and extract at least particular portions of the content 606 that may be of interest to a user (e.g., subject line text, text of a body of a message, metadata of a web document . . . ). The scanning component 602 can then deliver the scanned/extracted content to an analysis component 608 that can generate a query 610 associated with content scanned/extracted by the scanning component 602. Furthermore, the query 610 can be generated as a function of query frequency information 612 that resides within a data repository 614 together with information relayed to the analysis component 608 by way of the scanning component 602 (as has been described above). The query frequency information 612 can be generated by analyzing search logs 616 associated with a search component 618 (e.g., a search engine). In more detail, search engines typically retain search logs for queries provided thereto. A log analyzer component 620 can retrieve query frequency information by analyzing the search logs 616. As the search logs 616 can be on the order of millions of queries, a hashing component 622 can be employed to hash such search logs 616 (and thus reduce storage space necessary to store such logs). The hashing component 622 can then relay hashed logs to the data repository 614, wherein the hashed logs can be employed as at least part of the query frequency information 612.

Referring again to the analysis component 608, such component 608 can utilize an artificial intelligence component 624 in connection with outputting the query 610 to a user (and/or the search component 618 as described above). For instance, the artificial intelligence component 624 can make inferences regarding form and content of the query 610 based at least in part upon user history, user context, document type, document content, and other suitable parameters. As used herein, the term "inference" refers generally to the process of reasoning about or inferring states of the system, environment, and/or user from a set of observations as captured by way of events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action.

For example, the artificial intelligence component 616 can monitor user interaction with respect to a query output by the system 600 (or other previously described systems) and update the analysis component 608 based at least in part thereon. For instance, over time the artificial intelligence component 616 can determine that a user does not have interest in queries relating to weather (e.g., by monitoring user activity with respect to weather-related queries). Thus, the analysis component 608 can be updated to refrain from delivering weather-related queries to the user. The artificial intelligence component 624 can also be employed more granularly, determining form and content of the query 610 based upon time of day, day of week, time of year, user location, and the like. Thus, performance of the analysis component 608 can improve with utilization of the system 600.

The system 600 can also include a sales component 626 that facilitates sale of advertising space based at least in part upon scanned content of the document 604. For example, the scanning component 602 can extract text from the subject line that recites "trip to Las Vegas." The sales component 626 can analyze such text and sell advertising space to advertisers that are associated with Las Vegas, online casinos, or other forms of gambling. In another example, the sales component 626 and the analysis component 608 can be communicatively coupled. That is, the sales component 626 can receive the query 610 output by the analysis component 608 and sell advertising space based at least in part upon contents of the query 610. An advertisement can then be displayed to a user in conjunction with the document 604. The sales component 626, for example, can employ click-through rates and other data in connection with determining which advertisements to display to a user as well as an amount for which advertising space can be sold. In another example, the query 610 can be provided to potential advertisers who can then submit bids for display of an associated advertisement. Furthermore, the sales component 626 can facilitate conversion of prices. For instance, the sales component 626 can base sale of advertising space based upon price per impression, while the purchaser may wish to purchase the space based upon whether the advertisement is selected by a user. Accordingly, the sales component 626 can utilize tables that include conversion data to enable any suitable conversion of price. In still more detail regarding the sales component 626, such component can compute/consider a probability of a keyword or phrase being desired by a user and multiply such probability by an expected price of an advertisement associated with the keyword or phrase, an expected revenue of an advertisement associated with the keyword or phrase, or an expected click-through rate of an advertisement associated with the keyword or phrase.

Referring now to FIGS. 7-11, various methodologies for performing implicit querying are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. Further, it can be discerned that disparate acts shown and described in different methodologies can be utilized in conjunction. Also, those skilled in the art will understand and appreciate that a methodology could alternatively be represented as a series of interrelated states or events, such as in a state diagram. Moreover, not all illustrated acts may be required to implement a methodology in accordance with the subject claims. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 7:
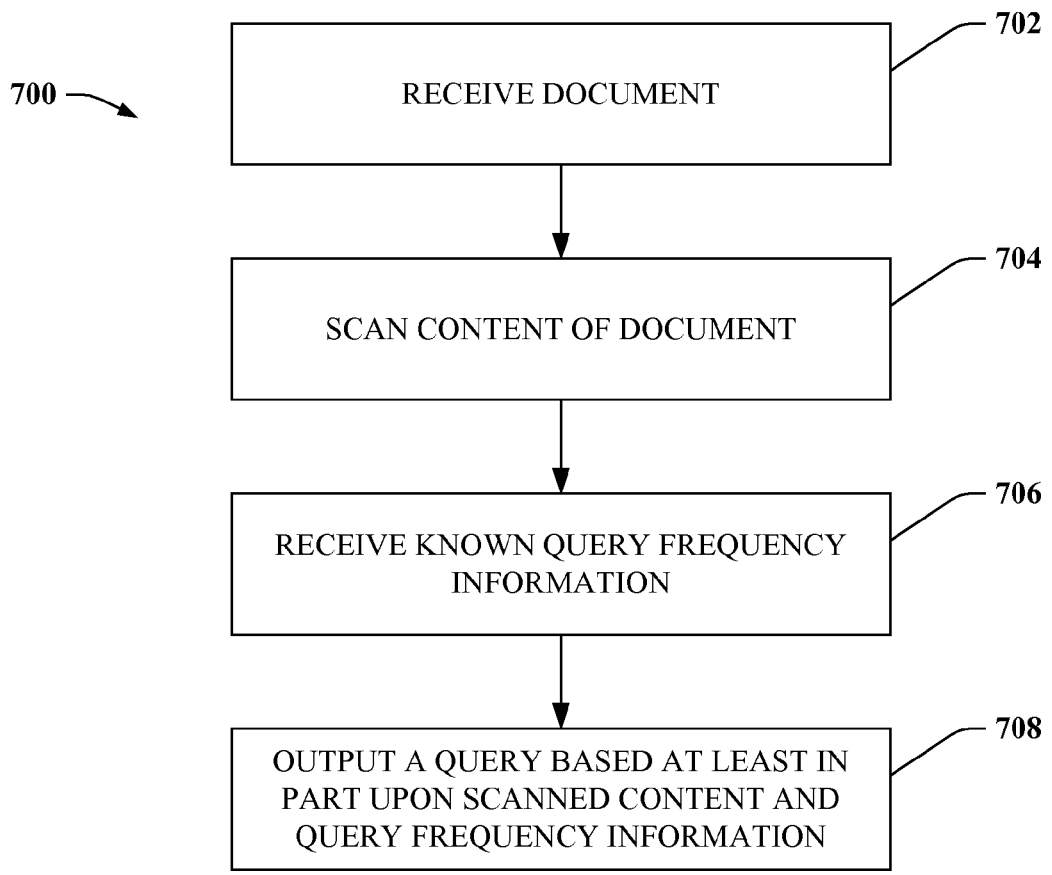
FIG. 7 is a representative flow diagram illustrating a methodology for performing implicit querying.

Referring now specifically to FIG. 7, a methodology 700 for performing implicit querying is illustrated. At 702, an electronic document is received. For example, the receipt of the document can occur at a web server, at a receiving client, at a machine that is associated with creation of the document, and/or an intermediary computing device. Furthermore, the electronic document can be received by a portable computing device, including a cellular phone, a personal digital assistant, a laptop computer, etc. At 704, content of the document is scanned to aid in determining whether more information can be obtained by way of a search with respect to at least a portion of the document. Disparate portions of the document can be scanned depending upon type of document, desired application, and the like. For instance, the document can be an email message, and it may be desirably to only scan text within the subject line of the email message. Further, it may be desirable to scan only a first few words or phrases of a sentence or message. Thus, any suitable portions of a document can be scanned and utilized in connection with aiding in determining a query.

At 706, known query frequency information is received. For example, the query frequency information can be received by way of analysis of search logs given a particular time period. Furthermore, query frequency information can be received by way of analyzing a search engine cache, which includes an integer number of most frequently utilized queries over a defined time period. Thus, the query frequency information can include a list of most frequently utilized queries of a search engine, most recently utilized queries associated with a search engine, a number of times that a particular query has been utilized over a defined period of time, and/or any other suitable query information. At 708, a query is output based at least in part upon the scanned content and the query frequency information. For example, a query can be generated based upon the scanned content, but not output unless the generated query corresponds to a high-frequency query (e.g., corresponds to a query within a search engine cache). In another example, the query can be generated based upon the scanned content and output to a user if the query is associated with a frequency above a threshold. In yet another example, query frequency information can be utilized as input together with the scanned content, and a query can be generated/output based upon the combined input. It can thus be readily discerned that any suitable combination of content of a document and query frequency information can be utilized to generate and/or output a query.

Figure 8:
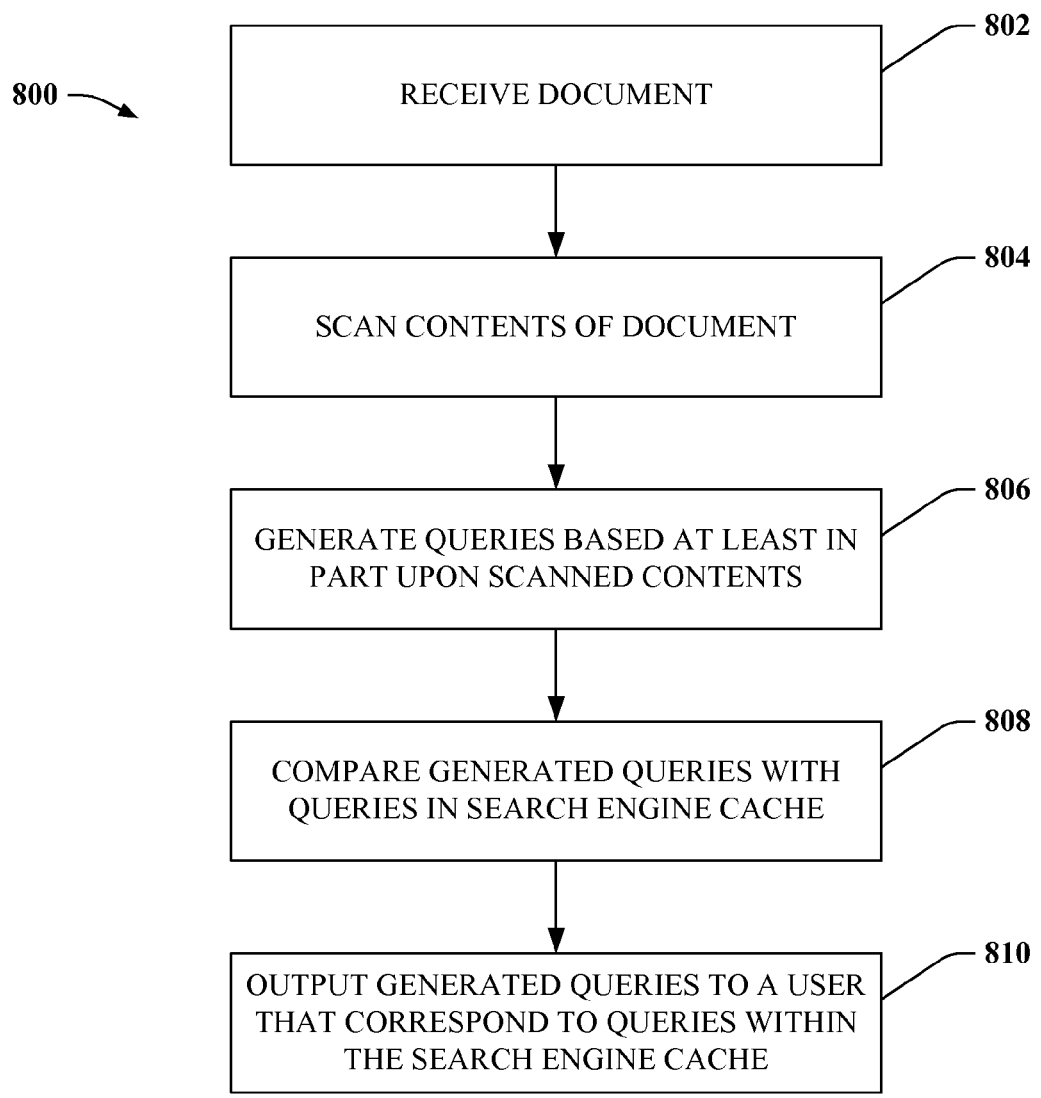
FIG. 8 is a representative flow diagram illustrating a methodology for utilizing a search engine cache in connection with implicitly outputting one or more queries.

Referring now to FIG. 8, a query generation methodology 800 is illustrated. At 802, an electronic document (e.g., email message, text message, instant messenger conversation, word processing document, . . . ) is received, and at 804 at least a portion of content of the document is scanned/extracted. Particular contents of the document to scan/extract can be defined by way of a set of rules, which can vary depending upon document type, user context, etc. At 806, a plurality of queries are automatically generated based at least in part upon the scanned/extracted contents. For example, a word or phrase in a subject line of an email message can be extracted and utilized to formulate a query that can be employed by a search engine. Further, capitalized words can be employed in connection with generating a query. Thus, based upon the scanned/extracted contents, any suitable number of queries that relate to such contents can be created.

At 808, the generated queries can be compared with queries located within a search engine cache. As described above, search engine caches typically retain an integer number of most utilized queries over a set amount of time. This information is cached to expedite processing of queries by a search engine. At 810, queries that sufficiently correspond to one or more queries within the cache can be output to a user. For example, it can be required that a query generated at 806 exactly match a query within the search engine cache. In a different example, a comparison algorithm can be undertaken to determine a level of correspondence between a query generated at 806 and queries within the search engine cache. For instance, by way of the aforementioned algorithm, it can be determined that a certain percentage of correspondence exists between the generated query and one or more cached queries. A query from the cache and/or the generated query can be output to a user if the level of correspondence therebetween is above a threshold.

Figure 9:
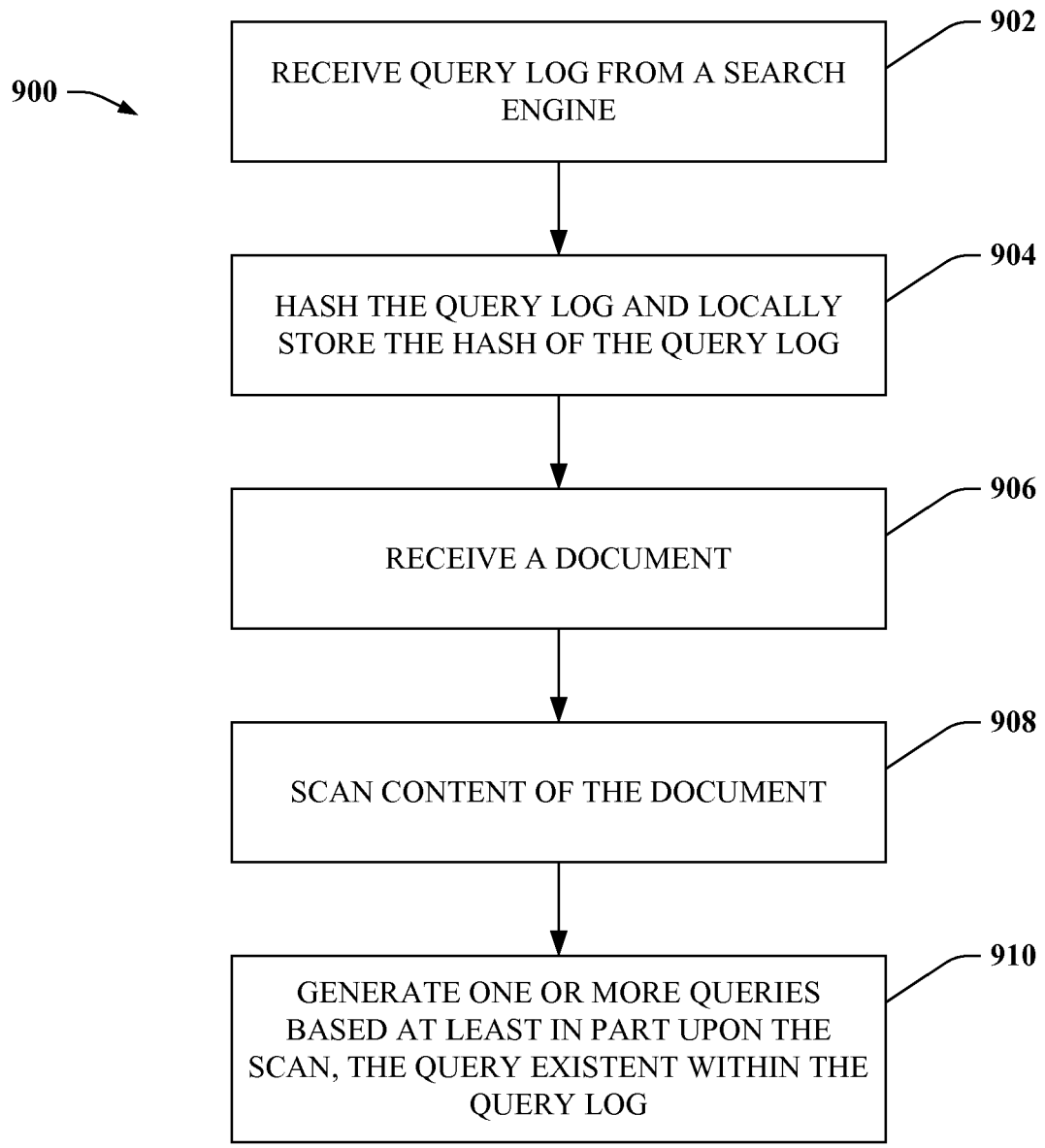
FIG. 9 is a representative flow diagram illustrating a methodology for hashing queries in connection with outputting a query to a user.

Now turning to FIG. 9, a methodology 900 for generating/outputting a query with respect to an electronic document is illustrated. At 902, a query log from a search engine is received, wherein the query log includes queries submitted to the search engine over a specified portion of time. At 904, the query log is hashed and stored at a location other than at the search engine. For instance, a hash of each of the queries within the query log can be stored on an email system, at a client, or any other suitable location. Search engine query logs can include millions of queries and thus can be quite substantial in size, and thus it can be desirable to hash the queries therein to reduce size associated therewith. At 906, an electronic document is received, and at 908 at least a portion of the content of the document is identified and scanned. At 910, one or more queries are generated based at least in part upon the scan, wherein the one or more queries correspond to one or more queries within the query log. Utilizing the query logs ensures that a generated query has been previously utilized, and thus is presumptively not nonsensical and/or directed at towards an extremely specific topic.

Figure 10:
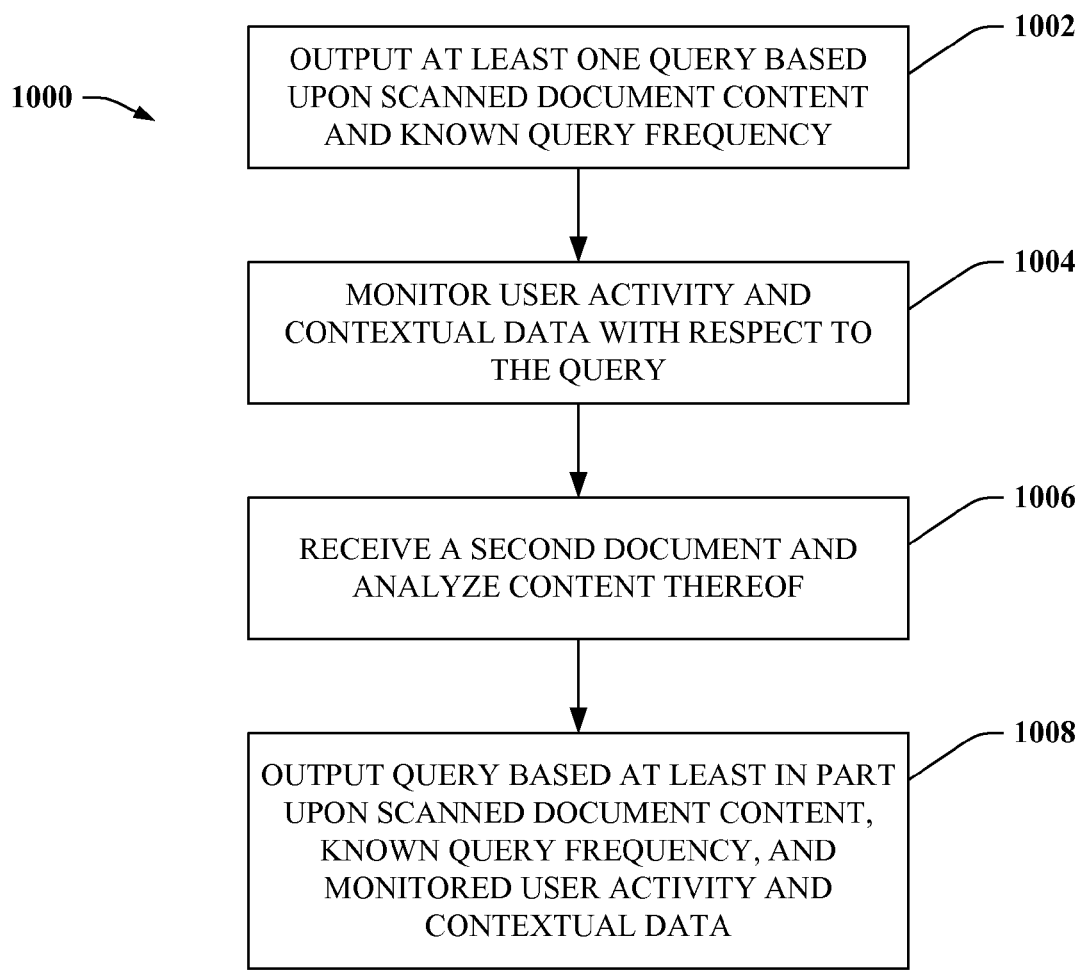
FIG. 10 is a representative flow diagram illustrating a methodology for monitoring user activity with respect to queries and outputting at least one query based at least in part upon the monitoring.

Turning now to FIG. 10, a methodology 1000 that can be utilized to implicitly generate queries is illustrated. At 1002, at least one query is output based upon scanned document content and query frequency information (as described in FIGS. 6-9). At 1004, user activity and contextual data is monitored/recorded with respect to the query. For example, whether the user selects the query to initiate a search is monitored, as well as time of day, day of week, type of document, and any other suitable contextual information. Such information can be monitored and/or recorded for each query provided to a user. Given sufficient data, patterns in user activities can be recognized and modeled, and queries can be output to the user based at least in part upon such patterns. The patterns discerned may generalize over a single user, a particular group of users, or all users. For instance, it can be determined that a particular user is unlikely to use "weather" terms, or a group of users in Los Angeles are unlikely to do so, or that all users are unlikely to do so. At 1006, a second document is received and contents thereof can be analyzed. At 1008, a query is output to a user based at least in part upon the analyzed document content, query frequency information, and monitored user activity and contextual data. Thus, for instance, if the user repeatedly does not select a query relating to a particular city, it can be recognized that the user has little interest in such city and a number of queries provided to the user relating to the city can be reduced.

Figure 11:
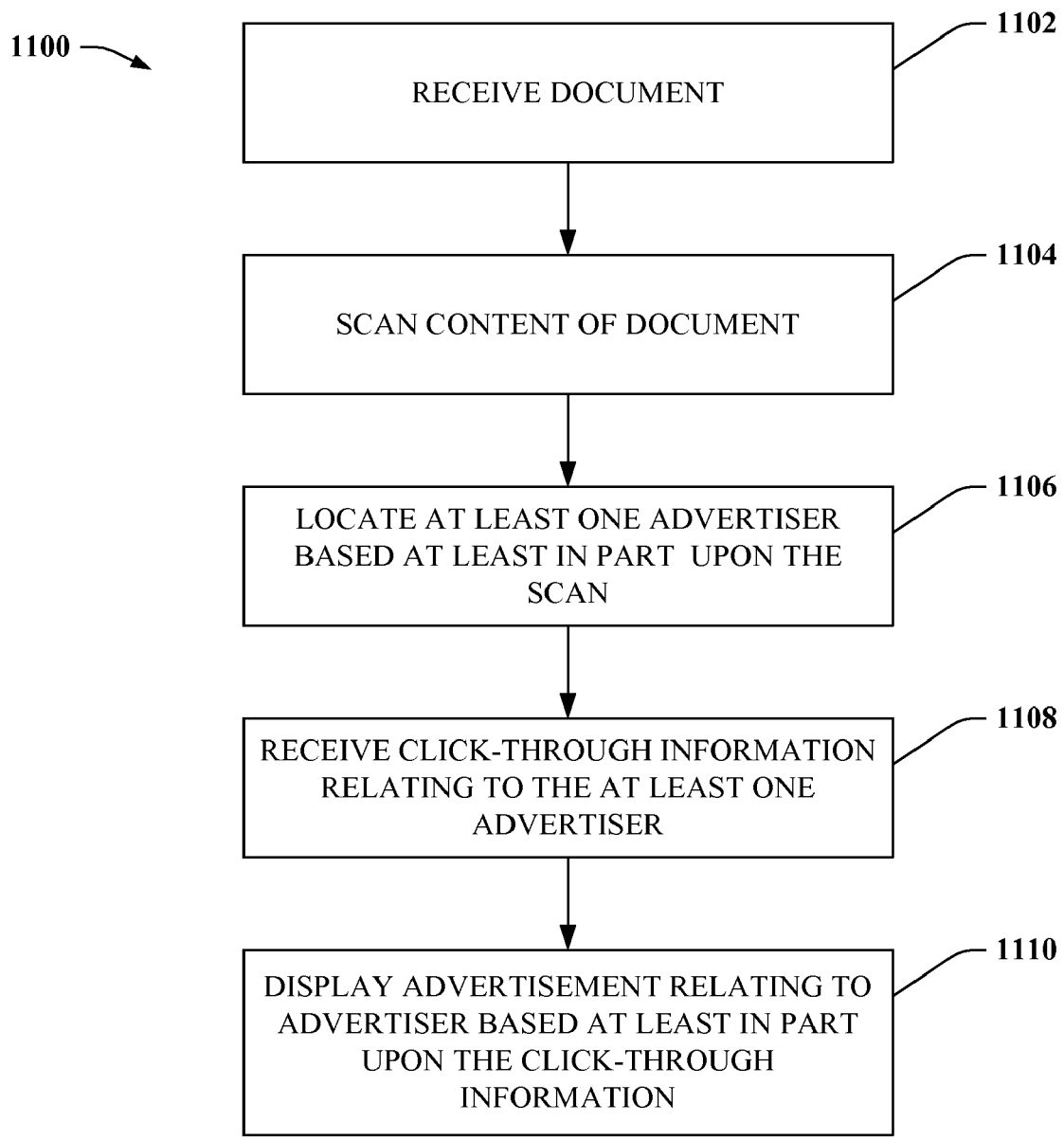
FIG. 11 is a representative flow diagram illustrating a methodology for displaying advertisements based at least in part upon content of an electronic document.

Turning now to FIG. 11, a methodology 1100 for automatically selling advertising space based upon content of a document is illustrated. At 1102, a document is received and at 1104 at least a portion of content of the document is analyzed. At 1106, an advertiser is located based at least in part upon the scan. For example, a query can be generated based upon a scan of the document (as described above), and an advertiser can be located through utilization of content of the query. More particularly, in a manner as is done conventionally with search engines, advertisers can enter bids for advertising space based upon content/form of the query.

At 1108, click-through information relating to the at least one advertiser is received. Such information can be utilized in connection with pricing the advertising space, as many advertisers pay on a per-click basis (rather than paying per displayed advertisement). In another example, click-through information relating to a particular user can be received (e.g., which types of advertisements that the user will likely select). At 1110, the advertisement is displayed based at least in part upon the click-through information 1110. For instance, the click-through information can be utilized in connection with determining an amount of a bid, and thus the advertisement can be displayed as a function of the bid price. Also, the user's click-through information can be employed to determine type of advertisement—thus enabling maximization of revenue of the entity selling advertising space.

Figure 12:
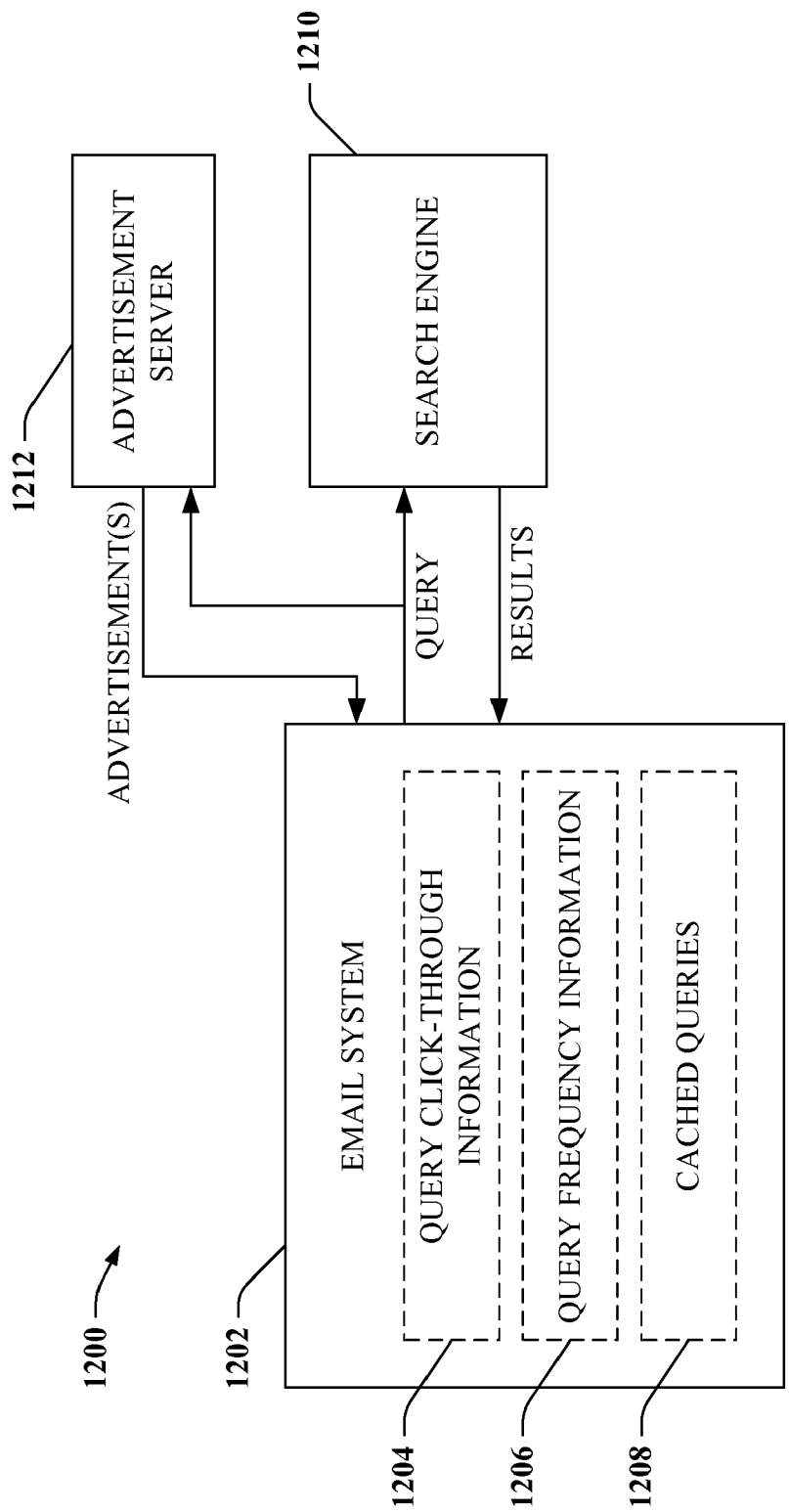
FIG. 12 is an exemplary system that facilitates implicit query generation.

Turning now to FIG. 12, an exemplary implicit querying system 1200 is illustrated. The system 1200 includes an email system 1202 that is utilized for creation, reviewing, deliverance, and reception of email messages. The email system 1202 can include any suitable software and/or hardware to enable the aforementioned functionalities. For instance, the email system 1202 can include one or more email servers that can store software and information, including emails, email attachments, user preferences, and the like.

The email system 1202 can include click-through information 1204 relating to advertisements and/or queries provided to a user (as described above). The click-through information can also include global information that is indicative of click-through rates for certain advertisements and/or query terms. The email system 1202 can also be employed to house query frequency information 1206. This information can be obtained by monitoring search engine utilization over a particular period of time. The email system 1202 can further store cached queries 1208 (e.g., queries that are existent within a search engine cache—the N most frequency utilized queries, where N is an integer). In accordance with the systems and/or methods described above, upon receipt of a document a component (not shown) within the email system 1202 can utilize the click-through information 1204, query frequency information 1206, and/or the cached queries 1208 to automatically generate a query relating to content of the received document.

A query generated within the email system 1202 can be delivered to a search engine 1210 and/or an advertisement server 1212. Such deliverance can occur automatically or after user-selection of the query. For example, the query can be automatically delivered to the advertisement server 1212, which can then cause an advertisement to be displayed in association with an email message. In another example, the query can be automatically delivered to the search engine 1210, and the search engine 1210 can cause search results of the query to be displayed in conjunction with an email message. In still another example, the query may be delivered to the search engine 1210 and/or the advertisement server 1212 only after user-selection of such query.

Figure 13:
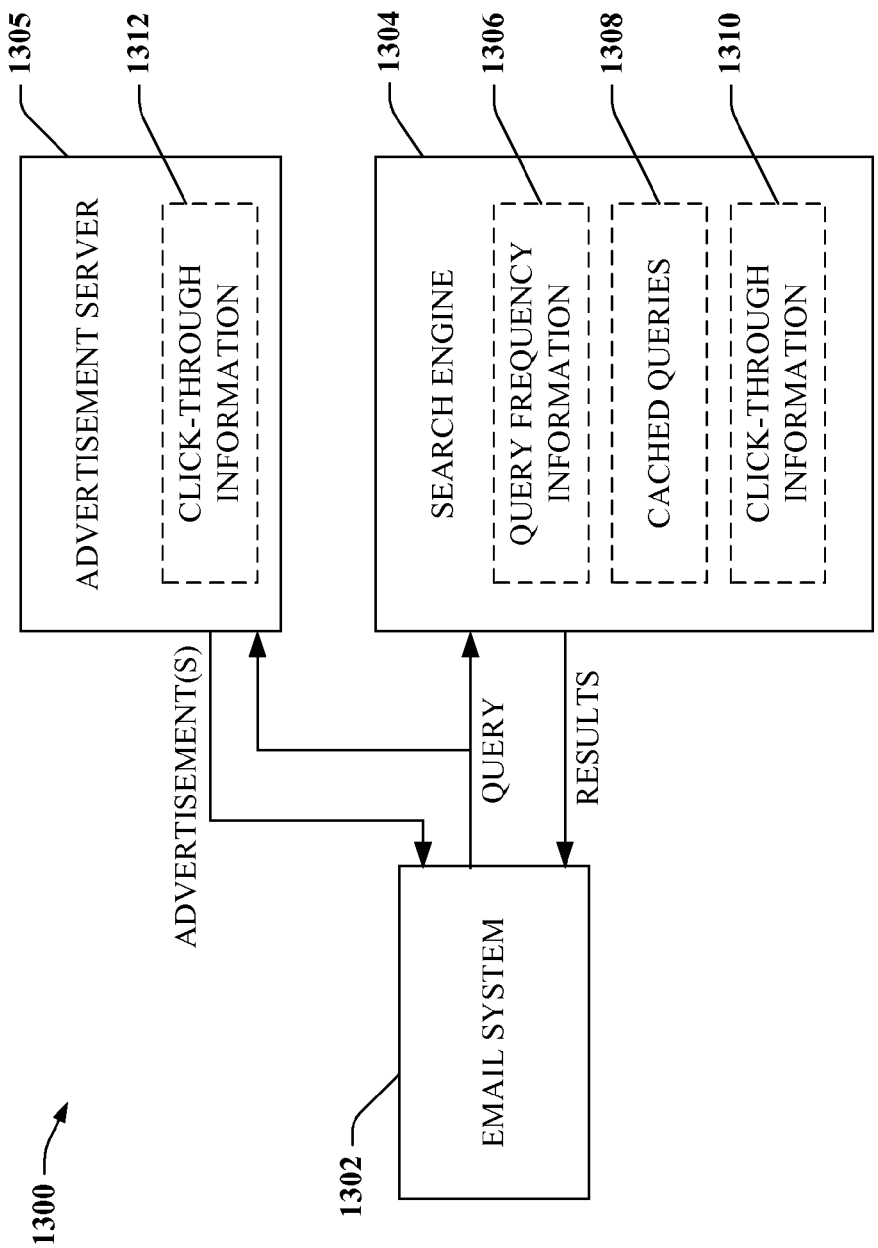
FIG. 13 is an exemplary system that facilitates implicit query generation.

Now turning to FIG. 13, an implicit querying system 1300 is illustrated. The system 1300 includes an email system 1302 that is utilized for email message functionalities. The email system 1302 can access a search engine 1304 and an advertisement server 1305, and receive information stored thereon. For example, the search engine 1304 can house query frequency information 1306, cached queries 1308 (e.g., queries within a search engine cache), and click-through information 1310 relating to queries provided to a user that a user selects. The advertisement server 1305 can store click-through information 1312 relating to a particular user, an advertisement, an advertiser, or any other suitable information.

Upon generation and/or receipt of a document within the email system 1302, contents of the search engine 1304 can be accessed to output a query to a user as described above. For instance, the email system 1302 can access the query frequency information 1306, the cached queries 1308, and the click-through information 1310 by way of a network connection. This can relieve the email system 1302 of the burden of housing a substantial amount of data. Similarly, the email system 1302 can be provided with click-through information 1312 from the advertisement server 1305 to alleviate burdens of storing such information on the email system 1302. The email system 1302 can them employ the click-through information 1312 in connection with selling advertising space to a purchaser.

Figure 14:
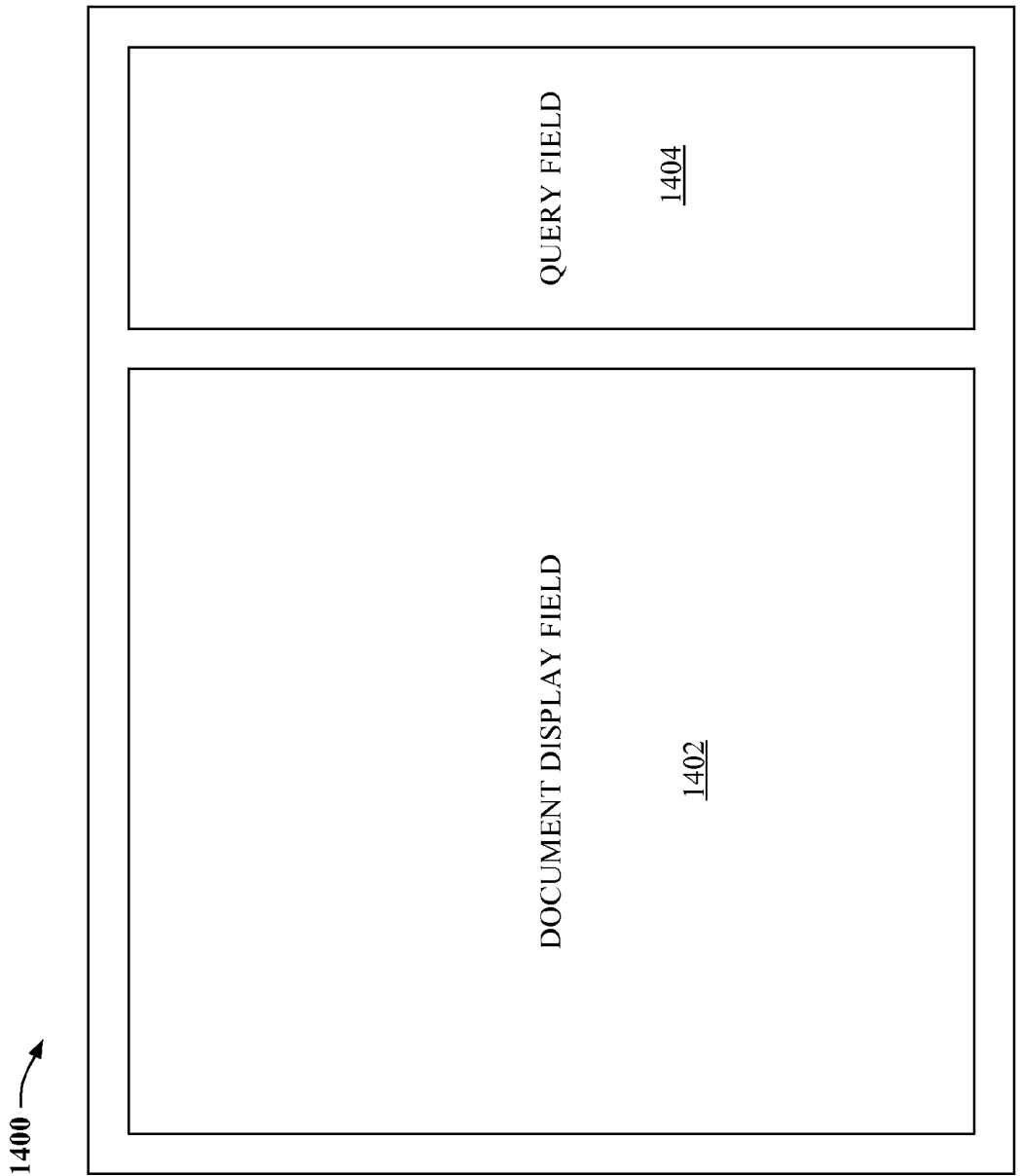
FIG. 14 is an exemplary user interface that can display an electronic document and queries associated therewith.

Now referring to FIG. 14, an exemplary user interface 1400 that can display content of a document as well as queries associated therewith is illustrated. The user interface 1400 includes a document display field 1402 that is utilized to display contents of a document. For instance, a web document and/or text of an email can be displayed in the document display field 1402. Similarly, content of a word processing document can be displayed in the document display field 1402. The user interface 1400 further includes a query field 1404 that is utilized to display queries related to content of a document displayed in the document display field 1402. Upon selection of a query, results of the query can also be shown in the query field 1404. In another example, upon user-selection of a query displayed in the query field 1404, a separate user interface (not shown) can be provided, wherein such interface displays search results associated with the selected query.

Figure 15:
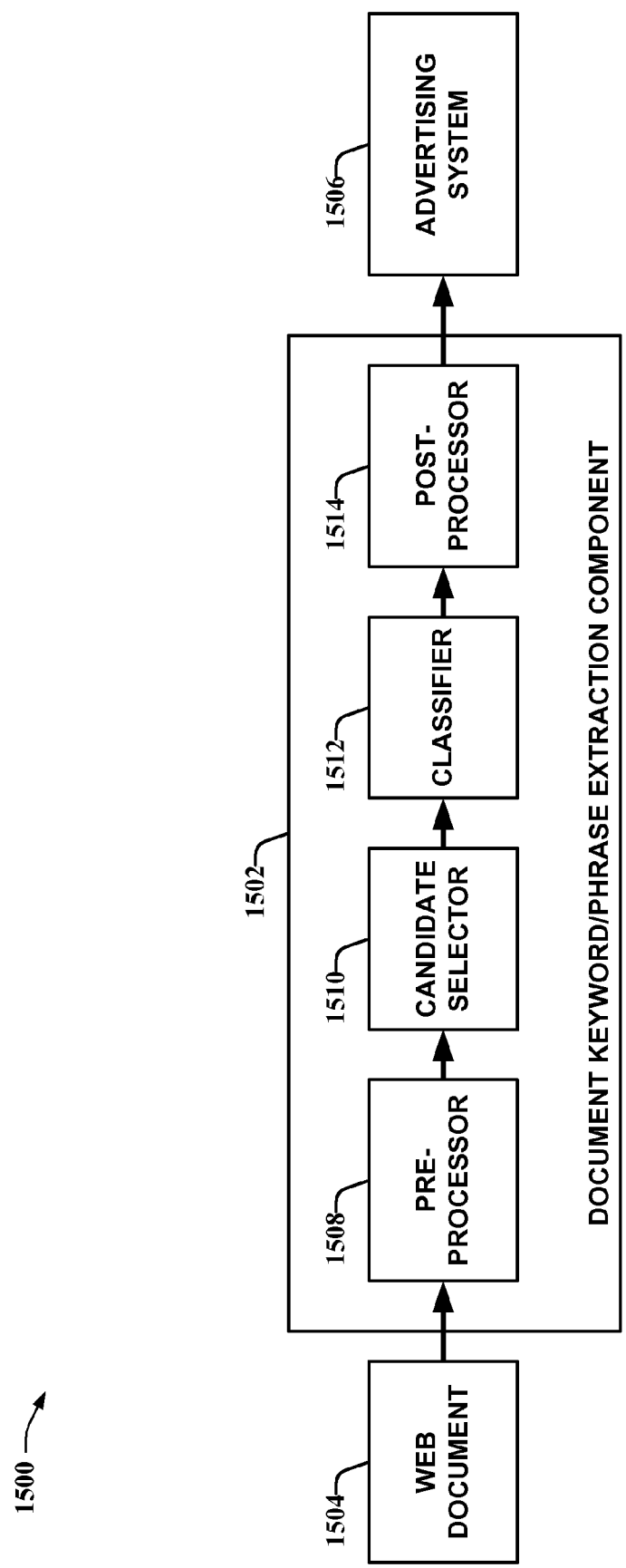
FIG. 15 is an exemplary system that facilitates web document keyword and/or phrase extraction.

Turning to FIG. 15, an exemplary system 1500 employs a document keyword/phrase extraction component 1502 that facilitates web document keyword and/or phrase extraction of a web document 1504. The system 1500 can be utilized to provide a ranked list of keywords and/or phrases for, for example, an advertising system 1506. A general architecture can be utilized for the exemplary system 1500 comprising four stages: a pre-processor 1508, a candidate selector 1510, a classifier 1512, and a post-processor 1514.

Pre-Processor

The pre-processor 1508 can transform web documents comprising, for example, an XML and/or an HTML document into an easy-to-process plain-text based document, while still maintaining important information. Blocks in the original web document are preserved, but formatting markers are removed such as, for example, XML and/or HTML tags and the like. For example, text in the same table are placed together without tags like <table>, <tr>, or <td>. Information about which phrases are part of an anchor text of hypertext links is also preserved. The meta section of a web document header is also an important source of useful information, even though most of the fields except the title are not displayed by web browsers.

The pre-processor first parses a web document and returns blocks of text in a body, hypertext information, and meta information in the header. Because a keyword should not cross sentence boundaries, a sentence splitter is applied to separate text in the same block into various sentences. To evaluate whether linguistic information can help keyword extraction, a state-of-the-art part-of-speech (POS) tagger is applied and a pos tag of each word is recorded. Most words or phrases that are relevant are short noun phrases. Therefore, having this information available as a feature can be useful. Thus, a state-of-the-art chunker can be applied to detect base noun phrases in each web document.

Candidate Selector

In this exemplary system 1500, the candidate selector 1510 considers each word and/or phrase (consecutive words) up to a length of five that appears in the document as a candidate keyword. This includes all keywords and/or phrases that appear in a title section and/or in meta-tags, as well as words and phrases in the body. A phrase is not selected by the candidate selector 1510 as a candidate if it crosses sentence or block boundaries. This can eliminate many trivial errors and can speed up the processing time by considering fewer keyword and/or phrase candidates. Each phrase can be considered separately and/or can be combined with other occurrences of the same phrase in the same web document. In addition, phrases can be considered monolithically and/or can be decomposed into their constituent words. The candidate selector 1510 can employ many different types of processing. Three different candidate selector processing mechanisms are provided as examples.

Monolithic, Separate (MoS)—In the monolithic separate candidate selector mechanism, fragments that appear in different web document locations are considered as different candidates even if their content is identical. That is, if the phrase "digital camera" occurred once in a beginning of a web document, and once in the end, it is considered as two separate candidates, with potentially different features. While some features, such as a phrase length and TF (term frequency) values, can be the same for these candidates, others, such as whether a phrase was capitalized, can be different. Thus, this variation is called Separate. In this candidate selector mechanism, all features of a candidate phrase are based on a phrase as a whole. For example, term frequency counts the number of times the exact phrase occurs in a web document, rather than using the term frequency of individual words. This is referred to as Monolithic. To simplify the description, "MoS" is used to refer to this type of mechanism.

Monolithic, Combined (MoC)—Since the ranked list of keywords is the important aspect, not where the keywords are extracted, the number of candidates can be reduced by combining identical (case ignored) fragments. For example, "Weather report" in a title and "weather report" in a body of a web document are treated as only one candidate. "MoC" is used to refer to this mechanism type. Note that even in the Combined case, word order matters, e.g., the phrase "weather report" is treated as different than the phrase "report weather."

Decomposed, Separate (DeS)—Keyword extraction can benefit by decomposing phrases into individual words, rather than examining them monolithically. Decomposing a phrase into its individual words can have certain advantages. For example, if the phrase "pet store" occurred only once in a web document, but the phrases "pet" and "store" each occurred many times separately, such a decomposed approach can make it easy to use this knowledge. Instead of selecting phrases directly as candidates, the decomposed approach tries to assign a label to each word in a document, as is done in related fields. That is, each of the words in a document is selected as a candidate, with multiple possible labels. The labels can be B (beginning of a keyphrase, when the following word is also part of the keyphrase), I (inside a keyphrase, but not the first or last word), L (last word of a keyphrase), U (unique word of a keyword of length l), and finally O (outside any keyword or keyphrase). This word-based framework requires a multi-class classifier to assign these five labels to a candidate word. In addition, it also needs a somewhat more sophisticated inference procedure to construct a ranked list of keywords in the post-processing stage, described infra. "DeS" is utilized to refer to this type of mechanism.

Classifier

The classifier 1512 is trained using machine learning. When a monolithic framework (MoS or MoC) is used, a binary classifier is trained. Given a phrase candidate, the classifier 1512 predicts whether the word or phrase is a keyword. When a decomposed framework (DeS) is used, a multi-class classifier is trained. Given a word, the goal is to predict the label as B, I, L, U, or O. Since whether a phrase is a keyword is ambiguous by nature, instead of a hard prediction, the classifier 1512 needs to predict how likely it is that a candidate has a particular label. In other words, the classifier 1512 needs to output some kind of confidence scores or probabilities. The scores or probabilities can then be used later to generate a ranked list of keywords, given a web document. The classifier 1512 can employ learning algorithms and/or features as described infra.

Learning Algorithm—Similar to the learning algorithm described supra using emails as an example, logistic regression techniques can also be employed as the learning algorithm for web documents. With this technique, an output variable Y is predicted, given a set of input features, $\overline{X}$. In a monolithic framework, Y is 1 if a candidate phrase is a relevant keyword and 0 otherwise. $\overline{X}$ is a vector of feature values associated with a particular candidate. For example, the vector can include a distance from a start of a web document, the term frequency (TF) and the web document frequency (DF) values for the phrase. The model returns an estimated probability, $P(Y=1|\overline{X}=\overline{x})$. The logistic regression model learns a vector of weights, $\overline{w}$, one for each input feature in $\overline{X}$. Continuing the example, it might learn a weight for the TF value, a weight for the DF value, and a weight for the distance value. The actual probability returned is $$P(Y = 1 \mid X = \overline{x}) = \frac{\exp(\overline{x} \cdot \overline{w})}{1 + \exp(\overline{x} \cdot \overline{w})} \quad \text{(Eq. 2)}$$

An interesting property of this model is its ability to simulate some simpler models. For example, if the logarithms of the TF and DF values are utilized as features, then if the corresponding weights are +1 and −1, Eq. 2 becomes:

$$\log(TF) - \log(DF) = \log(TF/DF) \quad \text{(Eq. 3)}$$

In other words, by including TF and DF as features, the TF×IDF model is simulated, but the logistic regression model also has the option to learn different weightings.

To actually train a logistic regression model, a set of training data is employed to find a weight vector $\overline{w}$ that makes it as likely as possible. The training instances consist of every possible candidate phrases selected from the training documents, with Y=1 if they were labeled relevant and 0 otherwise. As described supra in the email example, the SCGIS method can be utilized as an actual training method. However, because there is a unique best logistic regression model for a training set, and the space is convex, the actual choice of training algorithm makes relatively little difference.

In monolithic models, one decision is modeled—whether a word and/or phrase is relevant or not, so the variable Y can only take values 0 or 1. But for a decomposed framework, each word is analyzed to determine whether it is the beginning of a phrase, inside a phrase, etc. with five different possibilities (the BILUO labels). In this case, a generalized form of the logistic regression model can be utilized:

$$P(Y = i \mid \overline{x}) = \frac{\exp(\overline{x} \cdot \overline{w_i})}{\sum_{j=1}^{5} \exp(\overline{x} \cdot \overline{w_j})} \quad \text{(Eq. 4)}$$

That is, there are five different sets of weights, one for each possible output value. Note that for both forms of logistic regression, a special "always on" feature (e.g., a value of 1) is appended to the $\overline{x}$ vector that serves as a bias term. In order to prevent overfitting, a Gaussian prior with variance 0.3 can be applied for smoothing.

Features—Some features are binary, taking only the values 0 or 1, such as, for example, whether a phrase appears in a title of a web document. Others are real-valued, such as the TF or DF values or their logarithms. These features are described along with their variations when used in the monolithic (MoS) and decomposed (DeS) frameworks. Features used in the monolithic, combined (MoC) framework are similar as in the MoS framework. If in a web document, a candidate phrase in the MoC framework has several occurrences which correspond to several candidate phrases in the MoS framework, the features are combined using the following rules:

For binary features, the combined feature is a union of the corresponding features. That is, if this feature is active in any of the occurrences, then it is also active in the combined candidate.

For real-valued features, the combined feature takes the smallest value of the corresponding features.

To give an example for the binary case, if one occurrence of the term "digital camera" is in the anchor text of a hyperlink, then the anchor text feature is active in the combined candidate. Similarly, for a location feature, which is a real-valued case, the location of the first occurrence of this phrase is used as the corresponding combined value, since its value is the smallest. In the following description, example features are listed. It can be appreciated that these are only a few of the infinite number of web document features that can be utilized by instances described herein. Features are binary unless otherwise noted.

Linguistic Features—The linguistic information used in feature extraction includes: two types of pos tags—noun (NN & NNS) and proper noun (NNP & NNPS), and one type of chunk—noun phrase (NP). The variations used in MoS are: whether the phrase contain these pos tags; whether all the words in that phrase share the same pos tags (either proper noun or noun); and whether the whole candidate phrase is a noun phrase. For DeS, they are: whether the word has the pos tag; whether the word is the beginning of a noun phrase; whether the word is in a noun phrase, but not the first word; and whether the word is outside any noun phrase.

Capitalization Features—Whether a word is capitalized is an indication of being part of a proper noun and/or an important word. This set of features for MoS is defined as: whether all the words in the candidate phrase are capitalized; whether the first word of the candidate phrase is capitalized; and whether the candidate phrase has a capitalized word. For DeS, it is simply whether the word is capitalized.

Hypertext Features—Whether a candidate phrase and/or word is part of anchor text for a hypertext link is extracted as the following features. For MoS, they are: whether the whole candidate phrase matches exactly the anchor text of a link; whether all the words of the candidate phrase are in the same anchor text; and whether any word of the candidate phrase belongs to the anchor text of a link. For DeS, they are: whether the word is the beginning of the anchor text; whether the word is in the anchor text of a link, but not the first word; and whether the word is outside any anchor text.

Meta Section Features—The header of a web document such as, for example, an XML and/or HTML document can provide additional information embedded in meta tags. Although the text in this region is usually not seen by users, whether a candidate appears in this meta section can be important. For MoS, the features are: whether the whole candidate phrase is in the meta section. For DeS, they are: whether the word is the first word in a meta tag; and whether the word occurs somewhere in a meta tag, but not as the first word.

Title Features—Often, the only human readable text in a web document header is the title, which is usually put in a window caption by a web browser. For MoS, the feature is whether the whole candidate phrase is in the title. For DeS, the features are: whether the word is the beginning of the title; and whether the word is in the title, but not the first word.

Meta Features—In addition to the title, several meta tags are potentially related to keywords and are used to derive features. In the MoS framework, the features are: whether the whole candidate phrase is in the meta-description; whether the whole candidate phrase is in the meta-keywords; and whether the whole candidate phrase is in the meta-title. For DeS, the features are: whether the word is the beginning of the meta-description; whether the word is in the meta-description, but not the first word; whether the word is the beginning of the meta-keywords; whether the word is in the meta-keywords, but not the first word; whether the word is the beginning of the meta-title; and whether the word is in the meta-title, but not the first word.

Universal Resource Locator (URL) Features—A web document has one additional highly useful property—the name of the document which is its URL. For MoS, the features are: whether the whole candidate phrase is in part of the URL string; and whether any word of the candidate phrase is in the URL string. In the DeS framework, the feature is whether the word is in the URL string.

Information Retrieval Oriented Features—The TF (term frequency) and DF (document frequency) values of the candidate are considered as real-valued features. The web document frequency is derived by counting how many documents in a web document collection contain the given term. In addition to the original TF and DF frequency numbers, log (TF+1) and log(DF+1) are also used as features. The features used in the monolithic and the decomposed frameworks are similar, where for DeS, the "term" is the candidate word.

Candidate Relative Location Features—The beginning of a web document often contains an introduction or summary with important words and phrases. Therefore, the location of the occurrence of the word or phrase in the document is also extracted as a feature. Since the length of a document or a sentence varies considerably, the ratio of the location is utilized instead of the absolute number. For example, if a word appears in the 10th position, while the whole document contains 200 words, the ratio is then 0.05. These features used for the monolithic and decomposed frameworks are the same. When the candidate is a phrase, the location of its first word is used as its location. There are three different relative locations used as features: wordRatio—the relative location of the candidate in the sentence; sentRatio—the location of the sentence where the candidate is in divided by the total number of sentences in the document; wordDocRatio—the relative location of the candidate in the document. In addition to these three real-valued features, their logarithms can also be utilized as features, specifically, log(1+wordRatio), log(1+sentRatio), and log(1+wordDocRatio).

Sentence and Document Length Features—The length (in words) of the sentence (sentLen) where the candidate occurs, and the length of the whole document (docLen) (words in the header are not included) are used as features. Similarly, log (1+sentLen) and log(1+docLen) are also included.

Candidate Phrase Length Features—For the monolithic framework, the length of the candidate phrase (phLen) in words and log(1+phLen) are included as features. These features are not used in the decomposed framework.

Query Log Features—The query log of a search engine reflects the distribution of the keywords people are most interested in. The information is utilized to create the following features. For a monolithic framework, one binary feature is considered—whether the phrase appears in the query log and two real-valued features are considered—the frequency with which it appears and the log value, log(1+frequency). For a decomposed framework, more variations of this information are considered: whether a word appears in a query log file as a first word of a query; whether a word appears in a query log file as an interior word of a query; and whether a word appears in a query log file as a last word of a query. The frequency values of the above features and their log values (log(1+f), where f is the corresponding frequency value) are also used as real-valued features. Additionally, whether a word never appears in any query log entries is also a feature.

Post-Processor

After the classifier 1512 predicts the probabilities of the candidates associated with the possible labels, the keyword extraction system 1500 generates a list of keywords ranked by the probabilities utilizing the post-processor 1514. When a Monolithic Combined framework is used, the most probable words or phrases are returned. When a Monolithic Separate (MoS) framework is used, the highest probability of identical fragments is picked as the probability of the phrase. In the Decomposed Separate (DeS) framework, probabilities of individual words being phrase components (Beginning, Inside, etc.) are converted into probabilities of relevance of whole phrases. Given a phrase of length n, the overall probability for the phrase is calculated by multiplying by the probability of the individual words being the correct label of the label sequence. For example, if n=3, then the correct label sequence is B, I, L. The probability of this phrase being a keyword, $p_1$, is derived by $p(w_1=B) \cdot p(w_2=I) \cdot p(w_3=L)$. If the phrase is not a keyword, then the correct label sequence is O, O, O. The corresponding probability, $p_0$, is then $p(w_1=O) \cdot p(w_2=O) \cdot p(w_3=O)$. The actual probability used for this phrase is then $p_1/(p_0+p_1)$.

Figure 16:
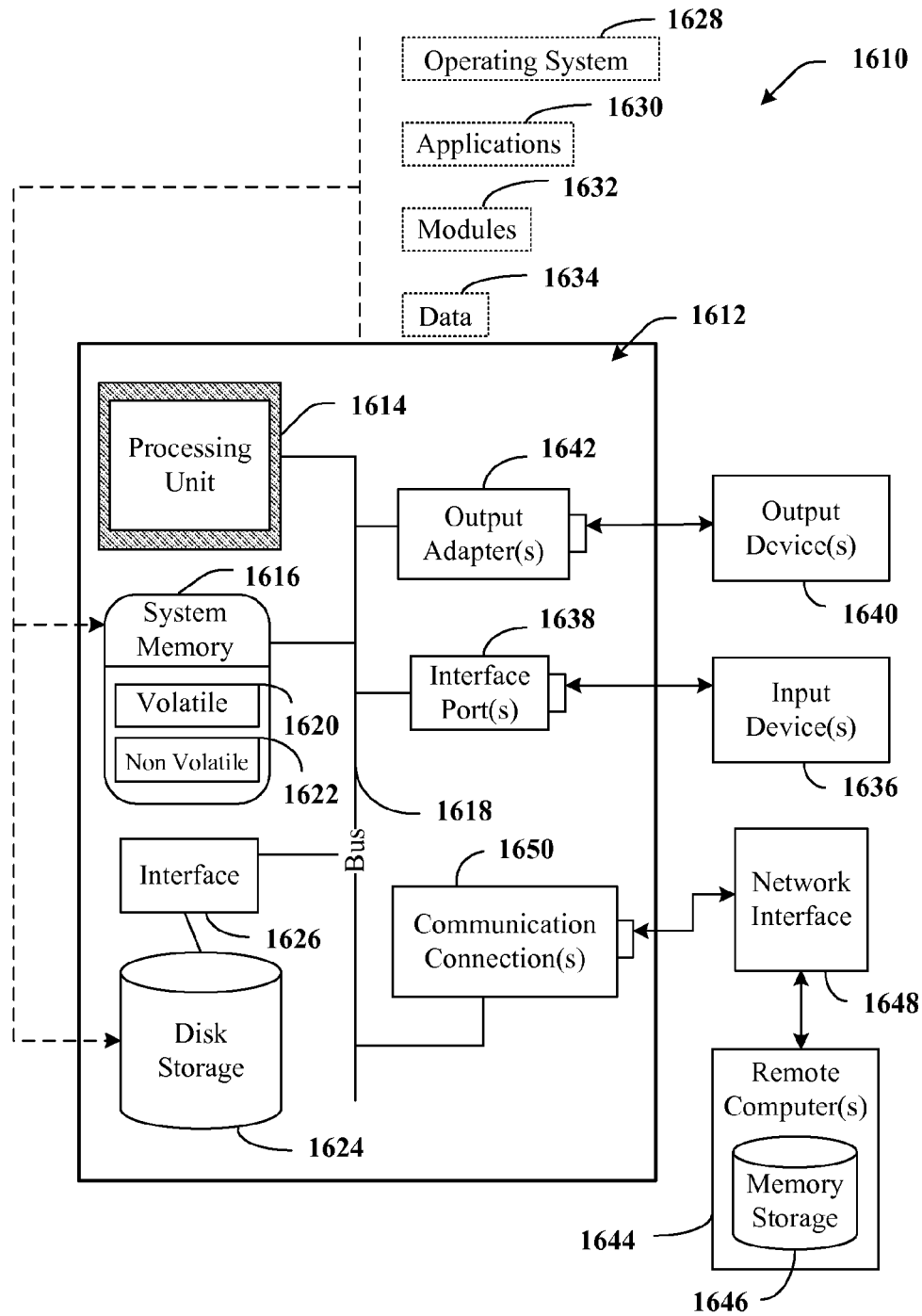
FIG. 16 is a schematic block diagram illustrating an exemplary operating environment.
Figure 17:
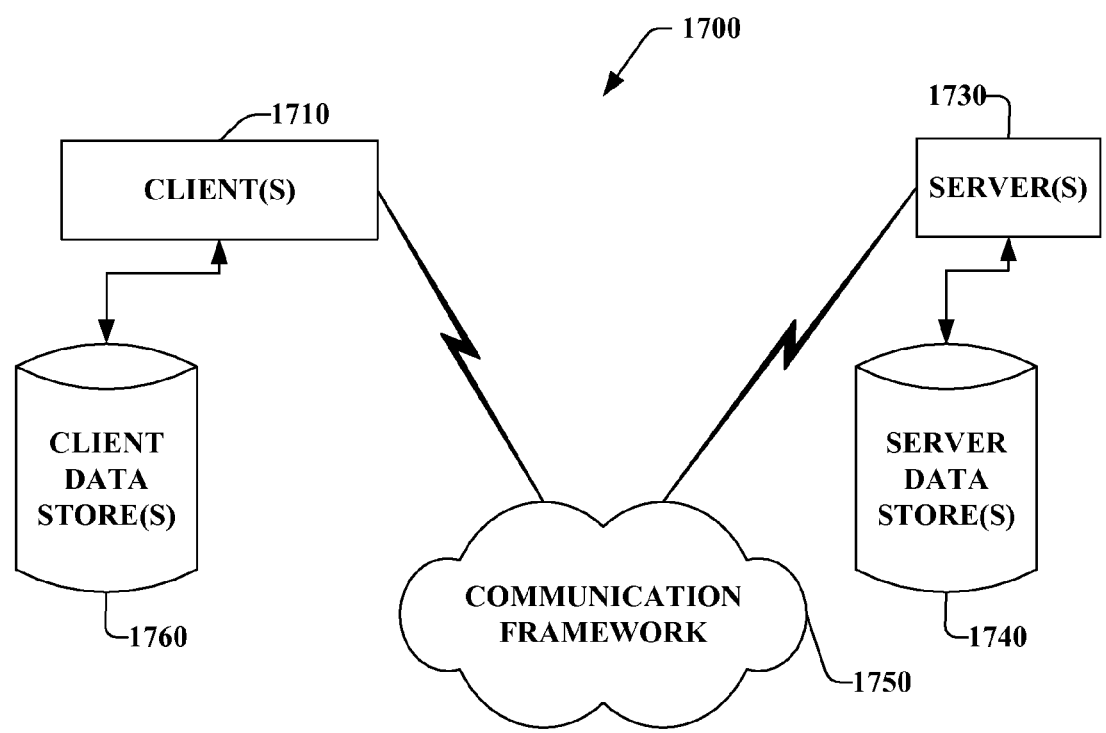
FIG. 17 is a schematic block diagram of a sample-computing environment.

In order to provide a context for the various aspects of the claimed subject matter, FIGS. 16 and 17 as well as the following discussion are intended to provide a brief, general description of a suitable computing environment in which the various aspects may be implemented. While the claimed subject matter has been described above in the general context of computer-executable instructions of a computer program that runs on a computer and/or computers, those skilled in the art will recognize that the claimed subject matter also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects may also be practiced in distributed computing environments where task are performed by remote processing devices that are linked through a communications network. However, some, if not all aspects described herein can be practiced on stand-alone computers. In a distributed computing environment, program modules may be located in both local and remote memory storage devices.

With reference to FIG. 16, an exemplary environment 1600 for implementing various aspects of the claimed subject matter includes a computer 1612. The computer 1612 includes a processing unit 1614, a system memory 1616, and a system bus 1618. The system bus 1618 couples system components including, but not limited to, the system memory 1616 to the processing unit 1614. The processing unit 1614 can be any of various available processors. Dual microprocessors and other multiprocessor architectures also can be employed as the processing unit 1614.

The system bus 1618 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1616 includes volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable ROM (EEPROM), or flash memory. Volatile memory 1620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1612 also includes removable/non-removable, volatile/non-volatile computer storage media. FIG. 16 illustrates, for example disk storage 1624. Disk storage 4124 includes, but is not limited to, devices like a magnetic disk drive, floppy disk drive, tape drive, Jaz drive, Zip drive, LS-100 drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1624 to the system bus 1618, a removable or non-removable interface is typically used such as interface 1626.

It is to be appreciated that FIG. 16 describes software that acts as an intermediary between users and the basic computer resources described in suitable operating environment 1610. Such software includes an operating system 1628. Operating system 1628, which can be stored on disk storage 1624, acts to control and allocate resources of the computer system 1612. System applications 1630 take advantage of the management of resources by operating system 1628 through program modules 1632 and program data 1634 stored either in system memory 1616 or on disk storage 1624. It is to be appreciated that the claimed subject matter can be implemented with various operating systems or combinations of operating systems.

A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port may be used to provide input to computer 1612 and to output information from computer 1612 to an output device 1640. Output adapter 1642 is provided to illustrate that there are some output devices 1640 like displays (e.g., flat panel and CRT), speakers, and printers, among other output devices 1640 that require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a personal computer, a server, a router, a network PC, a workstation, a microprocessor based appliance, a peer device or other common network node and the like, and typically includes many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1650 refers to the hardware/software employed to connect the network interface 1648 to the bus 1618. While communication connection 1650 is shown for illustrative clarity inside computer 1612, it can also be external to computer 1612. The hardware/software necessary for connection to the network interface 1648 includes, for exemplary purposes only, internal and external technologies such as, modems including regular telephone grade modems, cable modems, power modems and DSL modems, ISDN adapters, and Ethernet cards.

FIG. 17 is a schematic block diagram of a sample-computing environment 1700 with which the claimed subject matter can interact. The system 1700 includes one or more client(s) 1710. The client(s) 1710 can be hardware and/or software (e.g., threads, processes, computing devices). The system 1700 also includes one or more server(s) 1730. The server(s) 1730 can also be hardware and/or software (e.g., threads, processes, computing devices). The server(s) 1730 can house threads to perform transformations by employing various aspects described herein, for example. One possible communication between a client 1710 and a server 1730 may be in the form of a data packet transmitted between two or more computer processes. The system 1700 includes a communication framework 1750 that can be employed to facilitate communications between the client(s) 1710 and the server(s) 1730. The client(s) 1710 are operatively connected to one or more client data store(s) 1760 that can be employed to store information local to the client(s) 1710. Similarly, the server(s) 1730 are operatively connected to one or more server data store(s) 1740 that can be employed to store information local to the servers 1730.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A system comprising:
   a user interface for displaying a web document to a user;
   a processor in communication with the user interface and coupled to computer readable storage media storing instructions adapted to be executed by the processor;
   a scanning component implemented by the processor to receive the web document for display on the user interface and scan content of the web document to select candidate phrases comprising at least one word in the web document;
   an analysis component implemented by the processor to:
      access at least one of a search engine query log file or a search engine cache containing a plurality of search queries received from a plurality of different users of a search engine;
      identify, from the plurality of search queries received from the plurality of different users, query frequency information comprising a list of words frequently submitted as the search queries to the search engine by the plurality of different users of the search engine over a defined period of time;
      extract at least one phrase comprising at least one word from the web document based, at least in part, on a comparison of the candidate phrases with the list of words frequently submitted as the search queries to the search engine by the plurality of different users;
      generate at least one query based upon the at least one phrase extracted; and
      provide the at least one query based upon the at least one phrase to an advertising system in communication with the processor; and
   a display component to display at least one advertisement on the user interface in conjunction with display of the content of the web document, the at least one advertisement being received by the processor from the advertising system in response to the at least one query provided to the advertising system.

2. The system according to claim 1, wherein the web document comprises one of an extensible markup language (XML) based document or a hypertext markup language (HTML) based document.

3. The system according to claim 1, wherein the analysis component utilizes whether a candidate phrase is part of anchor text for a hypertext link for extracting the at least one phrase from the web document for generating the at least one query.

4. The system according to claim 1, wherein the analysis component utilizes whether a candidate phrase appears in a meta section of a header of the web document for extracting the at least one phrase from the web document for generating the at least one query.

5. The system according to claim 1, wherein the analysis component utilizes whether a candidate phrase is part of an address of the web document for extracting the at least one phrase from the web document for generating the at least one query.

6. The system according to claim 1, wherein the analysis component utilizes a position of a candidate phrase, relative to a sentence the candidate phrase is in for extracting the at least one phrase from the web document for generating the at least one query.

7. The system according to claim 6, wherein the web document comprises an email message received by the processor and displayed on the user interface, wherein content of the email message is scanned to detect the at least one phrase.

8. The system according to claim 1, wherein the analysis component utilizes a length of a sentence that a phrase is in and a length of a whole of the web document for extracting the at least one phrase from the web document for generating the at least one query.

9. The system according to claim 1,
   wherein the at least one query is automatically displayed on the user interface in conjunction with display of the content of the web document, and
   wherein the at least one query is provided to the advertisement system and the at least one advertisement is displayed on the user interface in conjunction with the display of the content of the web document following user selection of the at least one query displayed on the user interface.

10. The system according to claim 1 wherein the processor is embodied in one of a computer, a server, or a handheld electronic device.

11. A method implemented by one or more processors executing computer executable instructions embodied in computer-readable storage media, the method comprising:
   receiving a web document by the one or more processors for display on a user interface;
   identifying a plurality of candidate phrases comprising at least one word in the received web document by:
      incorporating a position of a candidate phrase relative to a sentence the candidate phrase is in when determining which candidate phrase to extract from the web document;
      selecting which candidate phrase to extract based, at least in part, on whether a candidate phrase appears in a meta section of a header of the web document;
      determining which candidate phrase to extract based, at least in part, on whether a candidate phrase is part of anchor text for a hypertext link;
      utilizing a length of a sentence that a candidate phrase is in and a length of a whole of the web document to evaluate which candidate phrase to extract; or
      evaluating which candidate phrase to extract based, at least in part, on whether a candidate phrase is part of an address of the web document;
   identifying, as query frequency information, a list of words reflecting queries utilized frequently by users of a search engine;
   extracting at least one candidate phrase comprising at least one word from the web document based, at least in part, on a comparison of the candidate phrases with the list of words from the query frequency information;
   automatically generating a query based on the at least one candidate phrase extracted from the web document and the query frequency information; and
   delivering the query to a search engine or advertising system.

12. The method according to claim 11 further comprising: extracting the at least one phrase from an extensible markup language (XML) or hypertext markup language (HTML) based web document as the web document.

13. The method according to claim 11 further comprising displaying automatically one or more advertisements on the user interface in conjunction with display of content of the web document, wherein the one or more advertisements are provided in response to delivering the query to the advertising system.

14. The method according to claim 11 further comprising displaying automatically one or more search results on the user interface in conjunction with display of content of the web document, wherein the one or more search results are provided in response to delivering the query to the search engine.

15. The method according to claim 11, further comprising:
- prior to delivering the query to the search engine or advertising system, automatically displaying the generated query on the user interface in conjunction with displaying content of the web document, and
- delivering the query to the search engine or advertising system following user selection of the query displayed on the user interface.

16. A system comprising:
- a user interface for displaying a web document; and
- a processor in communication with the user interface and coupled to computer-readable storage media containing instructions to be executed by the processor for performing operations including:
  - receiving the web document for display on the user interface;
  - analyzing content of the web document for identifying content for use in generating a plurality queries related to the content of the web document, the analyzing including:
    - parsing the web document into blocks of parsed information including text information, hypertext information, or meta information;
    - selecting candidate phrases from the parsed information;
    - classifying the candidate phrases utilizing a trained machine learning process that employs a binary or multi-class classifier to predict a likelihood that the candidate phrases have a particular class label; and
    - generating, as the plurality of queries, a list of advertising phrases ranked by a classification likelihood;
  - selecting at least one query of the plurality queries utilizing, at least in part, query frequency information, the query frequency information comprising a list of search queries submitted most frequently by users of a search engine based on analysis of at least one of a search engine cache or search engine log files, the selecting comprising comparing the list of search queries from the query frequency information with the plurality of queries from the web document; and
  - displaying one or more advertisements on the user interface in conjunction with display of the content of the web document, the one or more advertisements being automatically determined based upon the at least one of the queries selected, at least in part, utilizing the query frequency information and the analyzing the content of the web document.

17. The system according to claim 16, the operations further comprising:
- displaying the at least one of the queries selected on the user interface prior to displaying the one or more advertisements; and
- displaying the one or more advertisements on the user interface following user selection of the at least one of the queries displayed on the user interface.

18. The system according to claim 16 wherein the processor is embodied in one of a computer, a server, or a handheld electronic device.

* * * * *